United States Patent
Saka et al.

(10) Patent No.: US 10,610,856 B2
(45) Date of Patent: Apr. 7, 2020

(54) CATALYST FOR CATALYTIC CRACKING OF HYDROCARBON OIL AND METHOD FOR CATALYTIC CRACKING OF HYDROCARBON OIL

(71) Applicant: COSMO OIL CO., LTD., Tokyo (JP)

(72) Inventors: Yuji Saka, Satte (JP); Tetsuya Kimura, Satte (JP); Norihito Chiyoda, Satte (JP); Kenji Nagai, Satte (JP); Mitsunori Tabata, Satte (JP)

(73) Assignee: COSMO OIL CO., LTD., Tokyo (JP)

(*) Notice: Subject to any disclaimer, the term of this patent is extended or adjusted under 35 U.S.C. 154(b) by 204 days.

(21) Appl. No.: 14/425,659

(22) PCT Filed: Oct. 8, 2013

(86) PCT No.: PCT/JP2013/077332
§ 371 (c)(1),
(2) Date: Mar. 4, 2015

(87) PCT Pub. No.: WO2014/057931
PCT Pub. Date: Apr. 17, 2014

(65) Prior Publication Data
US 2015/0209771 A1   Jul. 30, 2015

(30) Foreign Application Priority Data
Oct. 10, 2012  (JP) ................. 2012-225009

(51) Int. Cl.
| | | |
|---|---|---|
| *B01J 29/80* | (2006.01) | |
| *C10G 11/05* | (2006.01) | |
| *B01J 29/08* | (2006.01) | |
| *B01J 29/40* | (2006.01) | |
| *B01J 37/00* | (2006.01) | |
| *B01J 21/08* | (2006.01) | |
| *B01J 27/16* | (2006.01) | |
| *B01J 29/00* | (2006.01) | |
| *B01J 29/04* | (2006.01) | |
| *B01J 37/28* | (2006.01) | |
| *B01J 37/04* | (2006.01) | |
| *B01J 38/12* | (2006.01) | |
| *B01J 29/70* | (2006.01) | |
| *B01J 29/90* | (2006.01) | |

(52) U.S. Cl.
CPC .............. *B01J 29/80* (2013.01); *B01J 21/08* (2013.01); *B01J 27/16* (2013.01); *B01J 29/005* (2013.01); *B01J 29/049* (2013.01); *B01J 29/084* (2013.01); *B01J 29/088* (2013.01); *B01J 29/40* (2013.01); *B01J 37/0009* (2013.01); *B01J 37/0045* (2013.01); *B01J 37/28* (2013.01); *C10G 11/05* (2013.01); *B01J 29/405* (2013.01); *B01J 29/70* (2013.01); *B01J 29/90* (2013.01); *B01J 37/04* (2013.01); *B01J 38/12* (2013.01); *B01J 2229/186* (2013.01); *B01J 2229/20* (2013.01); *B01J 2229/42* (2013.01); *C10G 2400/02* (2013.01); *C10G 2400/20* (2013.01)

(58) Field of Classification Search
None
See application file for complete search history.

(56) References Cited

U.S. PATENT DOCUMENTS

| | | | |
|---|---|---|---|
| 3,758,403 A * | 9/1973 | Rosinki .................. | C10G 11/05 208/111.01 |
| 5,194,412 A | 3/1993 | Roberie et al. | |
| 6,211,104 B1 | 4/2001 | Shi et al. | |
| 2007/0170094 A1* | 7/2007 | Wakui .................... | B01J 29/405 208/120.1 |
| 2008/0058197 A1 | 3/2008 | Liu et al. | |
| 2008/0093263 A1* | 4/2008 | Cheng ..................... | B01J 29/80 208/114 |

FOREIGN PATENT DOCUMENTS

| | | |
|---|---|---|
| EP | 0156490 A2 | 10/1985 |
| JP | 60-208395 A | 10/1985 |
| JP | 4-354541 A | 12/1992 |
| JP | 11-192431 A | 7/1999 |
| JP | 2004-261628 A | 9/2004 |

(Continued)

OTHER PUBLICATIONS

Extended European Search Report dated Sep. 6, 2016, in European Patent Application No. 13845227.1.
First Notification of Reasons for Refusal dated Mar. 15, 2016, in Chinese Patent Application No. 201380049089.4, with English translation.
International Search Report, issued in PCT/JP2013/077332, dated Jan. 7, 2014.
Written Opinion of the International Searching Authority, issued in PCT/JP2013/077332, dated Jan. 7, 2014.
Examination Report dated Sep. 21, 2016, in Taiwan Patent Application No. 10216687, with English translation.

*Primary Examiner* — Melvin C. Mayes
*Assistant Examiner* — Colette B Nguyen
(74) *Attorney, Agent, or Firm* — Nixon & Vanderhye P.C.

(57) ABSTRACT

A catalyst for catalytic cracking of a hydrocarbon oil can produce a gasoline fraction having a high octane number in high yield while suppressing an increase in yield of a heavy distillate, and produce LPG having a high propylene content in high yield. The catalyst includes a specific amount of a granulated catalyst A that includes a zeolite having a sodalite cage structure, silicon derived from a silica sol, phosphorus and aluminum derived from mono aluminum phosphate, a clay mineral, and a rare-earth metal, and a specific amount of a granulated catalyst B that includes a pentasil-type zeolite, the ratio of the mass of phosphorus and aluminum derived from mono aluminum phosphate included in the granulated catalyst A to the mass of the pentasil-type zeolite included in the granulated catalyst B being 0.015 to 3000.

9 Claims, No Drawings

(56) References Cited

FOREIGN PATENT DOCUMENTS

| | | | |
|---|---|---|---|
| JP | 2005-536343 | A | 12/2005 |
| JP | 2007-190520 | A | 8/2007 |
| JP | 2008-055416 | A | 3/2008 |
| JP | 2008-518760 | A | 6/2008 |
| JP | 2010-247146 | * | 11/2010 |
| JP | 2010-247146 | A | 11/2010 |
| JP | 2012-170855 | A | 9/2012 |
| WO | WO 2004/020093 | A1 | 3/2004 |
| WO | WO 2006/050487 | A1 | 5/2006 |

* cited by examiner

CATALYST FOR CATALYTIC CRACKING OF HYDROCARBON OIL AND METHOD FOR CATALYTIC CRACKING OF HYDROCARBON OIL

This application is the U.S. national phase of International Application No. PCT/JP2013/077332 filed Oct. 8, 2013 which designated the U.S. and claims priority to Japanese Application No. 2012-225009 filed Oct. 10, 2012, the entire contents of each of which are hereby incorporated by reference.

TECHNICAL FIELD

The invention relates to a catalyst for catalytic cracking of a hydrocarbon oil (hereinafter may be referred to as "catalytic cracking catalyst"), and a method for catalytic cracking of a hydrocarbon oil (hereinafter may be referred to as "catalytic cracking method").

BACKGROUND ART

In recent years, it has been considered to be important to elevate consciousness of global environmental issues (i.e., consciousness of global environmental issues has risen), and take measures against global warming, and it has been desired to clean automotive exhaust gas taking account of its effects on the environment. It is known that the capability to clean automotive exhaust gas is affected by the performance of automobiles and the composition of gasoline. In particular, the petroleum refining industry is required to provide high-quality gasoline.

Gasoline is produced by blending a plurality of gasoline blend stocks obtained by a crude oil refining process. In particular, a gasoline fraction obtained by subjecting a heavy hydrocarbon oil to a fluid catalytic cracking reaction (hereinafter appropriately referred to as "FCC gasoline") is incorporated in gasoline in large quantities, and considerably affects the quality of gasoline.

The heavy hydrocarbon oil catalytic cracking reaction is a reaction that converts low-quality heavy oil obtained by a petroleum refining process into light hydrocarbon oil through catalytic cracking. When producing FCC gasoline, hydrogen, coke, liquid petroleum gas (LPG), light cycle oil (LCO) (i.e., middle distillate), as well as heavy cycle oil (HCO) and slurry oil (SLO) having a boiling point higher than that of LCO (i.e., heavy distillate) are produced as by-products.

Along with the recent structural changes in oil demand, it has been desired to increase the production of light olefins (e.g., propylene and ethylene) that are used as a petrochemical feedstock. The light olefins are mainly produced by cracking a heavy hydrocarbon oil using a thermal cracker or a fluid catalytic cracker, for example.

However, the yield of light olefins achieved by cracking a heavy hydrocarbon oil using a thermal cracker is low. Moreover, since the yield of light olefins considerably changes depending on the feedstock, it is difficult to deal with the current increase in demand.

A method that adds a high-silica zeolite having high acidity (e.g., ZSM-5) to a catalyst to increase the light olefin content in FCC gasoline and improve the octane number of FCC gasoline has been proposed as a method for cracking a heavy hydrocarbon oil using a fluid catalytic cracker (see Patent Document 1 (JP-A-60-208395)). However, this method has a technical problem in that the yield of a heavy distillate also increases, and it is difficult to implement an effective cracking reaction.

RELATED-ART DOCUMENT

Patent Document

Patent Document 1: JP-A-60-208395

SUMMARY OF THE INVENTION

Technical Problem

The inventors of the invention conducted extensive studies in order to solve the above technical problems, and found that a gasoline fraction having a high octane number can be produced in high yield while suppressing an increase in yield of a heavy distillate by utilizing a catalytic cracking catalyst that includes 20 to 50 mass % of a zeolite having a sodalite cage structure, 10 to 30 mass % (on a $SiO_2$ basis) of silicon derived from a silica sol, 0.1 to 21 mass % (on an $Al_2O_3 \cdot 3P_2O_5$ basis) of phosphorus and aluminum derived from mono aluminum phosphate, 5 to 65 mass % of a clay mineral, and 0 to 10 mass % (on an oxide basis) of a rare-earth metal.

However, a further improvement is required for this catalytic cracking catalyst in order to produce light olefins (e.g., propylene) in high yield.

In view of the above situation, an object of the invention is to provide a catalyst for catalytic cracking of a hydrocarbon oil, that can produce a gasoline fraction having a high octane number in high yield while suppressing an increase in yield of a heavy distillate, and produce LPG having a high propylene content in high yield, and a method for catalytic cracking of a hydrocarbon oil using the catalyst.

Solution to Problem

The inventors of the invention conducted extensive studies in order to achieve the above object. As a result, the inventors found that the above technical problem can be solved by a catalyst for catalytic cracking of a hydrocarbon oil that includes: a granulated catalyst A that includes 20 to 50 mass % of a zeolite having a sodalite cage structure, 10 to 30 mass % (on a $SiO_2$ basis) of silicon derived from a silica sol, 0.1 to 21 mass % (on an $Al_2O_3 \cdot 3P_2O_5$ basis) of phosphorus and aluminum derived from mono aluminum phosphate, 5 to 65 mass % of a clay mineral, and 0 to 10 mass % (on an oxide basis) of a rare-earth metal; and a granulated catalyst B that includes 1 to 70 mass % of a pentasil-type zeolite, the content of the granulated catalyst A and the content of the granulated catalyst B in the catalyst being 90 to 99.9 mass % and 0.1 to 10 mass %, respectively, and the mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B being 0.015 to 3000.

Several aspects of the invention provide the following.
(1) A catalyst for catalytic cracking of a hydrocarbon oil, the catalyst including:

a granulated catalyst A that includes 20 to 50 mass % of a zeolite having a sodalite cage structure, 10 to 30 mass % (on a $SiO_2$ basis) of silicon derived from a silica sol, 0.1 to 21 mass % (on an $Al_2O_3.3P_2O_5$ basis) of phosphorus and aluminum derived from mono aluminum phosphate, 5 to 65 mass % of a clay mineral, and 0 to 10 mass % (on an oxide basis) of a rare-earth metal; and a granulated catalyst B that includes 1 to 70 mass % of a pentasil-type zeolite, the content of the granulated catalyst A and the content of the granulated catalyst B in the catalyst being 90 to 99.9 mass % and 0.1 to 10 mass %, respectively, and the mass ratio (mass (on an $Al_2O_3.3P_2O_5$ basis) of phosphorus and aluminum derived from mono aluminum phosphate included in granulated catalyst A/mass of pentasil-type zeolite included in granulated catalyst B) of the mass (on an $Al_2O_3.3P_2O_5$ basis) of phosphorus and aluminum derived from mono aluminum phosphate included in the granulated catalyst A to the mass of the pentasil-type zeolite included in the granulated catalyst B being 0.015 to 3000.

(2) The catalyst according to (1), wherein the granulated catalyst A includes the zeolite having a sodalite cage structure, phosphorus and aluminum derived from mono aluminum phosphate, and the rare-earth metal so that the mass ratio ((sum of content (on an $Al_2O_3.3P_2O_5$ basis) of phosphorus and aluminum derived from mono aluminum phosphate and content (on an oxide basis) of rare-earth metal)/content of zeolite having sodalite cage structure) of the sum of the content (on an $Al_2O_3.3P_2O_5$ basis) of phosphorus and aluminum derived from mono aluminum phosphate and the content (on an oxide basis) of the rare-earth metal to the content of the zeolite having a sodalite cage structure is 0.003 to 1.55.

(3) A method for catalytic cracking of a hydrocarbon oil including bringing the catalyst according to (1) or (2) into contact with a hydrocarbon oil.

Advantageous Effects of the Invention

The aspects of the invention thus provide a catalyst for catalytic cracking of a hydrocarbon oil, that can produce a gasoline fraction having a high octane number in high yield while suppressing an increase in yield of a heavy distillate, and produce LPG having a high propylene content in high yield, and a method for catalytic cracking of a hydrocarbon oil using the catalyst.

DESCRIPTION OF EMBODIMENTS

Catalyst for Catalytic Cracking of Hydrocarbon Oil

A catalyst for catalytic cracking of a hydrocarbon oil (hereinafter may be referred to as "catalytic cracking catalyst") according to one embodiment of the invention is described below.

The catalyst for catalytic cracking of a hydrocarbon oil according to one embodiment of the invention includes:

a granulated catalyst A that includes 20 to 50 mass % of a zeolite having a sodalite cage structure, 10 to 30 mass % (on a $SiO_2$ basis) of silicon derived from a silica sol, 0.1 to 21 mass % (on an $Al_2O_3.3P_2O_5$ basis) of phosphorus and aluminum derived from mono aluminum phosphate, 5 to 65 mass % of a clay mineral, and 0 to 10 mass % (on an oxide basis) of a rare-earth metal; and a granulated catalyst B that includes 1 to 70 mass % of a pentasil-type zeolite, the content of the granulated catalyst A and the content of the granulated catalyst B in the catalyst being 90 to 99.9 mass % and 0.1 to 10 mass %, respectively, and the mass ratio (mass (on an $Al_2O_3.3P_2O_5$ basis) of phosphorus and aluminum derived from mono aluminum phosphate included in granulated catalyst A/mass of pentasil-type zeolite included in granulated catalyst B) of the mass (on an $Al_2O_3.3P_2O_5$ basis) of phosphorus and aluminum derived from mono aluminum phosphate included in the granulated catalyst A to the mass of the pentasil-type zeolite included in the granulated catalyst B being 0.015 to 3000.

The granulated catalyst A included in the catalytic cracking catalyst according to one embodiment of the invention includes 20 to 50 mass % of a zeolite having a sodalite cage structure, 10 to 30 mass % (on a $SiO_2$ basis) of silicon derived from a silica sol, 0.1 to 21 mass % (on an $Al_2O_3.3P_2O_5$ basis) of phosphorus and aluminum derived from mono aluminum phosphate, 5 to 65 mass % of a clay mineral, and 0 to 10 mass % (on an oxide basis) of a rare-earth metal.

The zeolite included in the granulated catalyst A has a sodalite cage structure (i.e., a structure that is formed by truncating each vertex of a three-dimensional regular octahedral crystal structure that includes aluminum and a silicon tetrahedron as basic units, and is formed by allowing aluminum or silicon to share vertex oxygen, and has a pore formed by a tetrakaidecahedral crystal structure defined by a four-membered ring, a six-membered ring, or the like). A zeolite that differs in pore structure, framework density, and channel structure is formed depending on the position and the method that the sodalite cages are linked.

The zeolite having a sodalite cage structure may be one or more zeolites selected from sodalite, A zeolite, EMT, X zeolite, Y zeolite, an ultra-stable Y zeolite, and the like. Among these, an ultra-stable Y zeolite is preferable.

The ultra-stable Y zeolite is synthesized using Y zeolite as a starting material. The ultra-stable Y zeolite shows only a small deterioration in crystallinity as compared with Y zeolite. The ultra-stable Y zeolite is normally produced by subjecting Y zeolite to a high-temperature water vapor treatment several times, and optionally treating the resulting product using a mineral acid (e.g., hydrochloric acid), a base (e.g., sodium hydroxide), a salt (e.g., calcium fluoride), or a chelating agent (e.g., ethylenediaminetetraacetic acid).

The ultra-stable Y zeolite obtained using the above method may be used in a state in which the ultra-stable Y zeolite is ion-exchanged with a cation selected from hydrogen, ammonium, and a polyvalent metal. A heat-shock crystalline aluminosilicate zeolite having better stability (see Japanese Patent No. 2544317) may be used the ultra-stable Y zeolite.

It is preferable that the ultra-stable Y zeolite (I) have a molar ratio "$SiO_2/Al_2O_3$" (in a bulk state) determined by chemical composition analysis of 4 to 15 (more preferably 5 to 10), (II) have a unit cell dimension of 24.35 to 24.65 Å (more preferably 24.40 to 24.60 Å), and (III) have a molar ratio of the number of Al atoms that form the zeolite framework to the total number of Al atoms included in the zeolite of 0.3 to 1.0 (more preferably 0.4 to 1.0).

The ultra-stable Y zeolite basically has the same crystal structure as that of natural faujasite, and is represented by the following compositional formula (oxide).

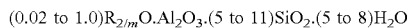

$(0.02 \text{ to } 1.0)R_{2/m}O.Al_2O_3.(5 \text{ to } 11)SiO_2.(5 \text{ to } 8)H_2O$ wherein R is an alkali metal ion or an alkaline-earth metal ion (e.g., Na or K), and m is the valence of R.

The molar ratio "$SiO_2/Al_2O_3$" of the zeolite (in a bulk state) determined by chemical composition analysis (see (I)) represents the acid strength of the granulated catalyst A. The granulated catalyst A exhibits higher acid strength as the molar ratio "$SiO_2/Al_2O_3$" increases. When the molar ratio "$SiO_2/Al_2O_3$" is 4 or more, an acid strength required to catalytically crack a heavy hydrocarbon oil can be obtained, and the cracking reaction can be advantageously effected. When the molar ratio "$SiO_2/Al_2O_3$" is 15 or less, the granulated catalyst A exhibits high acid strength (i.e., the desired number of acids can be obtained), and it is possible to easily ensure heavy hydrocarbon oil cracking activity.

The unit cell dimension of the zeolite (see (II)) represents the size of the unit cell of the zeolite. When the unit cell dimension is 24.35 Å or more, the number of Al atoms is appropriate for cracking a heavy oil, and the cracking reaction can be advantageously effected. When the unit cell dimension is 24.65 Å or less, a collapse in zeolite crystals can be easily suppressed, and a decrease in cracking activity of the catalyst can be easily suppressed.

If the number of Al atoms that form the zeolite framework is too large, the number of $Al_2O_3$ particles that are removed from the zeolite framework increases, and the catalytic cracking reaction may not proceed due to the absence of a strong acid site. When the molar ratio of the number of Al atoms that form the zeolite framework to the total number of Al atoms included in the zeolite (see (III)) is 0.3 or more, the above phenomenon can be avoided. When the molar ratio of the number of Al atoms that form the zeolite framework to the total number of Al atoms included in the zeolite is close to 1.0, most of the Al atoms included in the zeolite are incorporated in the unit cell of the zeolite, and effectively contribute to development of a strong acid site.

The granulated catalyst A can be provided with the desired high cracking activity by utilizing the zeolite having a sodalite cage structure.

The molar ratio "$SiO_2/Al_2O_3$" of the zeolite (in a bulk state) (see (III)) may be determined by inductively coupled plasma (ICP) spectrometry.

The unit cell dimension of the zeolite (see (II)) may be determined using an X-ray diffractometer (XRD).

The molar ratio of the number of Al atoms that form the zeolite framework to the total number of Al atoms included in the zeolite may be calculated from the molar ratio "$SiO_2/Al_2O_3$" (in a bulk state) determined by chemical composition analysis (see (I)) and the unit cell dimension (see (II)) using the following expressions (A) to (C). Note that the expression (A) is described in H. K. Beyer et al., J. Chem. Soc., Faraday Trans. 1, (81), 2899 (1985).

$$N_{Al}=(a0-2.425)/0.000868 \quad (A)$$

where, $N_{Al}$ is the number of Al atoms per unit cell, a0 is the unit cell dimension (nm), the value "2.425" is the unit cell dimension (nm) when all of the Al atoms included in the framework of the unit cell have been eliminated from the framework, and the value "0.000868" is an experimentally calculated value, and represents the slope of a linear expression (a0=0.000868$N_{Al}$+2.425).

$$(Si/Al)=(192-N_{Al})/N_{Al} \quad (B)$$

where, (Si/Al) is the calculated molar ratio "$SiO_2/Al_2O_3$" of the zeolite (in a bulk state),
$N_{Al}$ is the number of Al atoms per unit cell calculated using the expression (A), and the value "192" is the total number of Si atoms and Al atoms per unit dimension of Y zeolite.

Molar ratio of number of Al atoms that form zeolite framework to total number of Al atoms included in zeolite=(molar ratio "$SiO_2/Al_2O_3$" of zeolite (in bulk state) determined by chemical composition analysis)/(Si/Al) \quad (C)

where, (Si/Al) is the molar ratio "$SiO_2/Al_2O_3$" of the zeolite (in a bulk state) calculated using the expression (B).

The content of the zeolite having a sodalite cage structure in the granulated catalyst A included in the catalytic cracking catalyst according to one embodiment of the invention is 20 to 50 mass %, preferably 20 to 45 mass %, and more preferably 20 to 40 mass %.

When the content of the zeolite having a sodalite cage structure is 20 mass % or more, the desired cracking activity can be achieved. When the content of the zeolite having a sodalite cage structure is 50 mass % or less, the desired amounts of the clay mineral, and the component derived from a binder (e.g., silicon derived from a silica sol, and phosphorus and aluminum derived from mono aluminum phosphate) can be incorporated in the granulated catalyst A, and a catalytic cracker can be advantageously operated while maintaining the strength and the bulk density of the granulated catalyst A.

The granulated catalyst A included in the catalytic cracking catalyst according to one embodiment of the invention includes 10 to 30 mass % (on a $SiO_2$ basis) of silicon derived from a silica sol.

Examples of the silicon derived from a silica sol included in the granulated catalyst A included in the catalytic cracking catalyst according to one embodiment of the invention include silicon derived from various silicon compound sols. It is preferable that the silicon included in the granulated catalyst A be silicon derived from a water-soluble silica sol.

Several types of silica sol are known. For example, a colloidal silica sol is classified as a sodium-type colloidal silica sol, a lithium-type colloidal silica sol, an acid-type colloidal silica sol, and the like. The granulated catalyst A may include silicon derived from an arbitrary type of silica sol.

When producing the catalytic cracking catalyst on a commercial scale, silicon derived from a silica hydrosol obtained by reacting a diluted water glass aqueous solution with a sulfuric acid aqueous solution may be used.

The content (on a $SiO_2$ basis) of silicon derived from a silica sol in the granulated catalyst A included in the catalytic cracking catalyst according to one embodiment of the invention is 10 to 30 mass %, preferably 15 to 30 mass %, and more preferably 15 to 20 mass %.

When the content (on a $SiO_2$ basis) of silicon derived from a silica sol is 10 mass % or more, the strength of the granulated catalyst A is maintained, and it is possible to prevent an undesirable phenomenon such as scattering of the catalyst or mixing of the catalyst into the product oil. When the content (on a $SiO_2$ basis) of silicon derived from a silica sol is 30 mass % or less, an improvement in catalytic performance corresponding to the amount of usage is achieved, and it is advantageous from the economical point of view.

The granulated catalyst A included in the catalytic cracking catalyst according to one embodiment of the invention normally includes silicon derived from a silica sol in the form of an oxide.

A silica sol is used as a binder when preparing the granulated catalyst A. A silica sol is heated and oxidized when preparing the granulated catalyst A. It is possible to improve formability during granulation (microparticle formation), and easily obtain a spherical granulated catalyst A by utilizing a silica sol when preparing the granulated catalyst A. It is also possible to easily improve the fluidity and the wear resistance of the granulated catalyst A by utilizing a silica sol when preparing the granulated catalyst A.

The granulated catalyst A included in the catalytic cracking catalyst according to one embodiment of the invention includes 0.1 to 21 mass % (on an $Al_2O_3.3P_2O_5$ basis) of phosphorus and aluminum derived from mono aluminum phosphate.

Mono aluminum phosphate is a water-soluble acidic phosphate represented by $Al(H_2PO_4)_3$. Mono aluminum phosphate may also be referred to as aluminum monophosphate or aluminum biphosphate.

Mono aluminum phosphate is dehydrated by heating, and becomes stable in the form of an oxide (aluminum phosphate oxide ($AlPO_4$)). Since mono aluminum phosphate is present as a polynuclear complex polymer in an aqueous solution, and includes a large amount of hydroxyl groups on its surface, mono aluminum phosphate exhibits a strong binding force as compared with other aluminum sources. Therefore, mono aluminum phosphate is suitable as a binder for the granulated catalyst A.

The acidity of the granulated catalyst A, changes due to phosphorus and aluminum derived from mono aluminum phosphate, and exhibits improved cracking activity.

Therefore, the granulated catalyst A that includes phosphorus and aluminum derived from mono aluminum phosphate exhibits the desired high cracking activity, and can produce a high-quality gasoline fraction having a high octane number.

The content (on an $Al_2O_3.3P_2O_5$ basis) of phosphorus and aluminum derived from mono aluminum phosphate in the granulated catalyst A included in the catalytic cracking catalyst according to one embodiment of the invention is 0.1 to 21 mass %, preferably 0.1 to 18 mass %, more preferably 0.3 to 15 mass %, and still more preferably 0.5 to 8 mass %.

When the content of phosphorus and aluminum derived from mono aluminum phosphate is 0.1 mass % or more, hydrocarbon oil cracking activity is improved. When the content of phosphorus and aluminum derived from mono aluminum phosphate is 21 mass % or less, an improvement in catalytic performance corresponding to the amount of usage is achieved, and a high-quality gasoline fraction having a high octane number can be produced.

The silica sol and mono aluminum phosphate are oxidized during heating performed when preparing the granulated catalyst A, and are included in the granulated catalyst A in the form of an oxide.

An alumina sol may be used as an additional binder when preparing the granulated catalyst A. In this case, the alumina sol is included in the granulated catalyst A in the form of an oxide.

Examples of the alumina sol include a basic aluminum chloride ($[Al_2(OH)_nCl_{6-n}]_m$ (wherein 0<n<6, and m≤10)), an amorphous alumina sol, a pseudoboehmite-type alumina sol, a commercially available alumina sol, a solution prepared by dissolving gibbsite, bialite, boehmite, bentonite, or crystalline alumina in an acid solution, and the like. Among these, a basic aluminum chloride is preferable.

The alumina sol is dehydrated by heating, and becomes stable in the form of an oxide.

The granulated catalyst A included in the catalytic cracking catalyst according to one embodiment of the invention includes 5 to 65 mass % of a clay mineral.

Examples of the clay mineral include montmorillonite, kaolinite, halloysite, bentonite, attapulgite, bauxite, and the like.

The granulated catalyst A may include microparticles (fine particles) of a known inorganic oxide (e.g., silica, silica-alumina, alumina, silica-magnesia, alumina-magnesia, phosphorus-alumina, silica-zirconia, or silica-magnesia-alumina) that is normally used for a catalytic cracking catalyst, in combination with the clay mineral.

The content of the clay mineral in the granulated catalyst A included in the catalytic cracking catalyst according to one embodiment of the invention is 5 to 65 mass %, preferably 5 to 60 mass %, and more preferably 10 to 60 mass %.

When the content of the clay mineral is 5 mass % or more, the catalyst strength of the granulated catalyst A can be improved, and a catalytic cracker can be advantageously operated while maintaining the bulk density of the catalyst. When the content of the clay mineral is 65 mass % or less, the catalyst can be easily prepared in the presence of the desired amount of binder while maintaining the intended cracking activity by incorporating the zeolite having a sodalite cage structure, and the component derived from the binder (e.g., silica derived from a silica sol, and phosphorus and aluminum derived from mono aluminum phosphate) in the granulated catalyst A in a given ratio.

The granulated catalyst A included in the catalytic cracking catalyst according to one embodiment of the invention includes 0 to 10 mass % (on an oxide basis) of a rare-earth metal.

The rare-earth metal may be one or more rare-earth metals selected from scandium, yttrium, lanthanum, cerium, praseodymium, neodymium, samarium, gadolinium, dysprosium, holmium, and the like. Among these, lanthanum and cerium are preferable.

It is possible to suppress decomposition of the zeolite crystals, and improve the durability of the catalyst by incorporating the rare-earth metal in the granulated catalyst A.

The granulated catalyst A included in the catalytic cracking catalyst according to one embodiment of the invention includes the rare-earth metal as an optional component. The content (on an oxide basis) of the rare-earth metal in the granulated catalyst A is 0 to 10 mass %, preferably 0 to 7 mass %, and more preferably 0.1 to 1.5 mass %.

When the content (on an oxide basis) of the rare-earth metal in the granulated catalyst A is within the above range, the catalytic cracking catalyst according to one embodiment of the invention exhibits high cracking activity, and can produce a gasoline fraction having a high octane number.

The granulated catalyst A included in the catalytic cracking catalyst according to one embodiment of the invention preferably includes the zeolite having a sodalite cage structure, phosphorus and aluminum derived from mono aluminum phosphate, and the rare-earth metal so that the mass ratio ((sum of content (on an $Al_2O_3.3P_2O_5$ basis) of phosphorus and aluminum derived from mono aluminum phosphate and content (on an oxide basis) of rare-earth metal)/content of zeolite having sodalite cage structure) of the sum of the content (on an $Al_2O_3.3P_2O_5$ basis) of phosphorus and aluminum derived from mono aluminum phosphate and the content (on an oxide basis) of the rare-earth metal to the content of the zeolite having a sodalite cage structure is 0.003 to 1.55, more preferably 0.01 to 1.0, and still more preferably 0.01 to 0.5.

When the mass ratio ((sum of content (on an $Al_2O_3.3P_2O_5$ basis) of phosphorus and aluminum derived from mono aluminum phosphate and content (on an oxide basis) of rare-earth metal)/content of zeolite having sodalite cage structure) of the sum of the content (on an $Al_2O_3 \cdot 3P_2O_5$ basis) of phosphorus and aluminum derived from mono aluminum phosphate and the content (on an oxide basis) of the rare-earth metal to the content of the zeolite having a sodalite cage structure is 0.003 or more, the effects of the rare-earth metal and mono aluminum phosphate can be easily obtained. When the mass ratio ((sum of content (on an $Al_2O_3 \cdot 3P_2O_5$ basis) of phosphorus and aluminum derived from mono aluminum phosphate and content (on an oxide basis) of rare-earth metal)/content of zeolite having sodalite cage structure) of the sum of the content (on an $Al_2O_3 \cdot 3P_2O_5$ basis) of phosphorus and aluminum derived from mono aluminum phosphate and the content (on an oxide basis) of the rare-earth metal to the content of the zeolite having a sodalite cage structure is 1.55 or less, the catalytic performance corresponding to the amount of usage can be achieved.

The granulated catalyst A included in the catalytic cracking catalyst according to one embodiment of the invention may include a metal other than a rare-earth metal as long as the object of the invention can be achieved.

The content of the zeolite having a sodalite cage structure, the content (on a $SiO_2$ basis) of silicon derived from a silica sol, the content (on an $Al_2O_3 \cdot 3P_2O_5$ basis) of phosphorus and aluminum derived from mono aluminum phosphate, the content of the clay mineral, and the content (on an oxide basis) of the rare-earth metal in the granulated catalyst A included in the catalytic cracking catalyst according to one embodiment of the invention can be calculated from the amount of each raw material added when preparing the catalyst.

The particle size of the granulated catalyst A is not particularly limited as long as the granulated catalyst A has a particle size within the range normally employed for a catalytic cracking catalyst. The particle size of the granulated catalyst A is preferably 20 to 150 μm.

Note that the particle size of the granulated catalyst A refers to a value measured using a measurement device "Electromagnetic Micro Vibro Sifter M-2" (manufactured by Tsutsui Scientific Instruments Co., Ltd.).

A method for preparing the granulated catalyst A is described below.

The granulated catalyst A may be prepared using various methods. When preparing the granulated catalyst A that does not include the rare-earth metal, the granulated catalyst A may be prepared by drying an aqueous slurry that includes specific amounts of the zeolite having a sodalite cage structure, a silica sol, mono aluminum phosphate, and the clay mineral (hereinafter referred to as "preparation method a-1"), for example.

When preparing the granulated catalyst A that includes the rare-earth metal, the granulated catalyst A may be prepared by further performing an ion-exchange treatment using a specific amount of a rare-earth metal source (hereinafter referred to as "preparation method a-2").

Specific examples of the zeolite having a sodalite cage structure, the silica sol, mono aluminum phosphate, the clay mineral, and the rare-earth metal used when implementing the preparation method a-1 and the preparation method a-2 include those described above.

The preparation method a-1 prepares an aqueous slurry that includes the zeolite having a sodalite cage structure, the silica sol, mono aluminum phosphate, and the clay mineral.

The desired homogenous aqueous slurry can be obtained by adding the silica sol to water, and mixing the mixture to prepare a homogenous binder aqueous solution, adding mono aluminum phosphate, the zeolite having a sodalite cage structure, and the clay mineral to the binder aqueous solution, and mixing the mixture.

Note that part or all of mono aluminum phosphate that is to be included in the aqueous slurry may be added (mixed) when preparing the binder aqueous solution.

The solid content in the aqueous slurry is preferably 5 to 60 mass %, and more preferably 10 to 50 mass %. When the solid content in the aqueous slurry is within the above range, an appropriate amount of water is evaporated when drying the aqueous slurry (i.e., the aqueous slurry can be easily dried). Moreover, the aqueous slurry can be easily handled while preventing an increase in viscosity of the aqueous slurry.

The preparation method a-1 then dries the aqueous slurry.

It is preferable to dry the aqueous slurry by spray drying. Microspheres (catalyst or catalyst precursor) can be obtained by drying the aqueous slurry by spray drying.

It is preferable to dry the aqueous slurry by spray drying using a spray dryer at a gas inlet temperature of 200 to 600° C. and a gas outlet temperature of 100 to 300° C.

It is preferable that the microspheres obtained by spray drying have a particle size of 20 to 150 μm and a water content of 5 to 30 mass %.

When the microspheres do not include excess alkali metals, soluble impurities, and the like, the microspheres may be used directly as the granulated catalyst A.

The preparation method a-1 may subject the microspheres obtained by drying the aqueous slurry to a washing treatment and an ion-exchange treatment using a known method to remove excess alkali metals, soluble impurities, and the like derived from the raw materials.

The washing treatment may be performed using water or aqueous ammonia. The soluble impurity content can be reduced by washing the microspheres using water or aqueous ammonia.

The ion-exchange treatment may be performed using an aqueous solution of an ammonium salt such as ammonium sulfate, ammonium sulfite, ammonium hydrogen sulfate, ammonium hydrogen sulfite, ammonium thiosulfate, ammonium nitrite, ammonium nitrate, ammonium phosphinate, ammonium phosphonate, ammonium phosphate, ammonium hydrogen phosphate, ammonium dihydrogen phosphate, ammonium carbonate, ammonium hydrogen carbonate, ammonium chloride, ammonium bromide, ammonium iodide, ammonium formate, ammonium acetate, or ammonium oxalate. The alkali metal (e.g., sodium and potassium) content in the microspheres can be reduced by performing the ion-exchange treatment.

The washing treatment is normally performed before performing the ion-exchange treatment. Note that the ion-exchange treatment may be performed before performing the washing treatment as long as the washing treatment and the ion-exchange treatment can be performed without problems.

It is preferable to perform the washing treatment and the ion-exchange treatment until the alkali metal content and the soluble impurity content are reduced to a value equal to or less than the desired value. The catalytic activity can be advantageously improved by reducing the alkali metal content and the soluble impurity content to a value equal to or less than the desired value.

When using the preparation method a-1, it is preferable that the microspheres have an alkali metal content of 1.0 mass % or less, and more preferably 0.5 mass % or less, based on the dried catalyst, and have a soluble impurity content of 2.0 mass % or less, and more preferably 1.5 mass % or less, based on the dried catalyst.

It is preferable to dry the microspheres that have been subjected to the washing treatment and the ion-exchange treatment. In this case, the microspheres are preferably dried at a temperature of 100 to 500° C. until the microspheres have a water content of 1 to 25 mass %.

The preparation method a-1 can thus prepare the desired granulated catalyst A.

When using the preparation method a-1, the granulated catalyst A that includes the desired amounts (on a solid basis) of the zeolite having a sodalite cage structure, silicon derived from the silica sol, phosphorus and aluminum derived from mono aluminum phosphate, and the clay mineral can be prepared by adjusting the amount of each raw material.

The granulated catalyst A that includes the rare-earth metal can be prepared using the preparation method a-2.

The preparation method a-2 further performs an ion-exchange treatment using the desired amount of a rare-earth metal source.

Examples of a rare-earth metal that is ion-exchanged using the rare-earth metal source include those mentioned above. Examples of the rare-earth metal source include chlorides, nitrates, sulfates, acetates, and the like of these rare-earth metals.

The ion-exchange treatment using the rare-earth metal source may be performed on the microspheres obtained by drying the aqueous slurry, or the microspheres that have been subjected to the washing treatment and the prior ion-exchange treatment mentioned above (see the preparation method a-1).

The rare-earth metal may be incorporated in the microspheres by performing the ion-exchange treatment using the rare-earth metal source in accordance with a known method. For example, the microspheres may be subjected to the ion-exchange treatment using an aqueous solution that includes one type or two or more types of rare-earth metal compound (e.g., chloride, nitrate, sulfate, or acetate), or may be impregnated with the aqueous solution, and optionally heated.

When using the preparation method a-2, the zeolite having a sodalite cage structure may be subjected to the ion-exchange treatment using the rare-earth metal source before preparing the aqueous slurry.

In this case, the zeolite having a sodalite cage structure is converted into a zeolite having a rare-earth metal-modified sodalite cage structure, and the aqueous slurry is prepared using the zeolite having a rare-earth metal-modified sodalite cage structure.

The zeolite having a sodalite cage structure may be subjected to the ion-exchange treatment using the rare-earth metal source (i.e., the rare-earth metal may be incorporated in the zeolite having a sodalite cage structure) in accordance with a known method. For example, the zeolite having a sodalite cage structure may be subjected to the ion-exchange treatment in a dry state or a wet state using an aqueous solution that includes one type or two or more types of rare-earth metal compound (e.g., chloride, nitrate, sulfate, or acetate), or may be impregnated with the aqueous solution, and optionally heated.

When the granulated catalyst A includes the rare-earth metal, decomposition of the zeolite crystals can be suppressed, and the durability of the catalyst can be improved.

The preparation method a-2 can thus prepare the desired granulated catalyst A.

When using the preparation method a-2, the granulated catalyst A that includes specific amounts (on a solid basis) of the zeolite having a sodalite cage structure, silicon derived from the silica sol, phosphorus and aluminum derived from mono aluminum phosphate, the clay mineral, and the rare-earth metal can be prepared by adjusting the amount of each raw material.

The granulated catalyst A can be used alone as a catalytic cracking catalyst (particularly a fluid catalytic cracking catalyst). Note that it is possible to produce a gasoline fraction having a high octane number in high yield while suppressing an increase in yield of a heavy distillate, and produce LPG having a high propylene content in high yield, by utilizing the catalytic cracking catalyst according to one embodiment of the invention that further includes a specific amount of the granulated catalyst B in addition to the granulated catalyst A.

The catalytic cracking catalyst according to one embodiment of the invention includes the granulated catalyst B that includes 1 to 70 mass % of a pentasil-type zeolite.

Examples of the pentasil-type zeolite included in the granulated catalyst B include ZSM-5, ZSM-11, ZSM-12, ZSM-22, ZSM-23, ZSM-35, ZSM-38, ZSM-48, and the like. Among these, ZSM-5 is preferable.

It is preferable that the pentasil-type zeolite included in the granulated catalyst B have an atomic ratio "Si/Al" of 40 to 800, more preferably 40 to 500, and still more preferably 40 to 300.

When the atomic ratio "Si/Al" is 800 or less, it is possible to easily (sufficiently) increase the production of propylene. When the atomic ratio "Si/Al" is 40 or more, it is possible to effectively increase production of an olefin, and suppress unnecessary cracking of a gasoline fraction.

The content of the pentasil-type zeolite in the granulated catalyst B is 1 to 70 mass %, preferably 3 to 65 mass %, and more preferably 5 to 60 mass %.

When the content of the pentasil-type zeolite is 1 mass % or more, the desired propylene yield can be achieved. When the content of the pentasil-type zeolite is 70 mass % or less, the desired amount of third component (e.g., clay mineral and binder) can be incorporated in the catalyst, and a catalytic cracker can be advantageously operated while suppressing a decrease in strength and bulk density of the granulated catalyst B.

The granulated catalyst B may include a component derived from a binder, a clay mineral, a rare-earth metal, and the like in addition to the pentasil-type zeolite.

Examples of the component derived from a binder that may be included in the granulated catalyst B include silicon derived from a silica sol, phosphorus and aluminum derived from mono aluminum phosphate, and the like.

Examples of the silica sol that may be used as the binder include those used to prepare the granulated catalyst A.

The content (on a $SiO_2$ basis) of silicon derived from a silica sol in the granulated catalyst B is preferably 10 to 70 mass %, more preferably 15 to 70 mass %, and still more preferably 15 to 65 mass %.

When the content (on a $SiO_2$ basis) of silicon derived from a silica sol in the granulated catalyst B is 10 mass % or more, the strength of the granulated catalyst B can be advantageously maintained, and it is possible to prevent an undesirable phenomenon such as scattering of the catalyst or mixing of the catalyst into the product oil. When the content (on a $SiO_2$ basis) of silicon derived from a silica sol is 70 mass % or less, the catalytic performance corresponding to the amount of usage can be achieved, and it is advantageous from the economical point of view.

The details of mono aluminum phosphate that may be used to prepare the granulated catalyst B have been described above in connection with mono aluminum phosphate used to prepare the granulated catalyst A.

The content (on an $Al_2O_3 \cdot 3P_2O_5$ basis) of phosphorus and aluminum derived from mono aluminum phosphate in the granulated catalyst B is preferably 0 to 20 mass %, more preferably 0.1 to 18 mass %, and still more preferably 0.1 to 10 mass %.

The granulated catalyst B may include aluminum derived from an alumina sol or the like as the component derived from a binder.

It is preferable that the granulated catalyst B include silicon derived from a silica sol as the component derived from a binder, or include silicon derived from a silica sol, and phosphorus and aluminum derived from mono aluminum phosphate as the components derived from a binder.

Examples of the clay mineral that may be included in the granulated catalyst B include those mentioned above in connection with the clay mineral that is included in the granulated catalyst A.

The content of the clay mineral in the granulated catalyst B is preferably 10 to 85 mass %, more preferably 10 to 80 mass %, and still more preferably 15 to 70 mass %.

When the content of the clay mineral is 10 mass % or more, a catalytic cracker can be advantageously operated while suppressing a decrease in strength and bulk density of the granulated catalyst B. When the content of the clay mineral is 85 mass % or less, the desired amounts of the pentasil-type zeolite and the component derived from a binder can be incorporated in the catalyst, and the catalyst strength of the granulated catalyst B can be improved while achieving the desired cracking activity.

Examples of the rare-earth metal that may be included in the granulated catalyst B include those mentioned above in connection with the rare-earth metal that is included in the granulated catalyst A.

When the granulated catalyst B includes the rare-earth metal, decomposition of the pentasil-type zeolite crystals can be suppressed, and the durability of the granulated catalyst B can be improved.

The content of the pentasil-type zeolite, the content (on a $SiO_2$ basis) of silicon derived from a silica sol (optional component), the content (on an $Al_2O_3 \cdot 3P_2O_5$ basis) of phosphorus and aluminum derived from mono aluminum phosphate (optional component), the content of the clay mineral (optional component), and the content (on an oxide basis) of the rare-earth metal (optional component) in the granulated catalyst B included in the catalytic cracking catalyst according to one embodiment of the invention can be calculated from the amount of each raw material added when preparing the catalyst.

The particle size of the granulated catalyst B is not particularly limited as long as the granulated catalyst B has a particle size within the range normally employed for a catalytic cracking catalyst. The particle size of the granulated catalyst B is preferably 20 to 150 μm.

Note that the particle size of the granulated catalyst B refers to a value measured using a measurement device "Electromagnetic Micro Vibro Sifter M-2" (manufactured by Tsutsui Scientific Instruments Co., Ltd.).

A method for preparing the granulated catalyst B is described below.

The granulated catalyst B may be prepared using various methods. When preparing the granulated catalyst B that does not include a rare-earth metal, the granulated catalyst B may be prepared by drying an aqueous slurry that includes specific amounts of the pentasil-type zeolite, a binder (e.g., silica sol or mono aluminum phosphate) (optional component), and a clay mineral (optional component) (hereinafter referred to as "preparation method b-1"), for example.

When preparing the granulated catalyst B that includes a rare-earth metal, the granulated catalyst B may be prepared by further performing an ion-exchange treatment using a specific amount of rare-earth metal source (hereinafter referred to as "preparation method b-2").

Specific examples of the pentasil-type zeolite, the silica sol (optional component), mono aluminum phosphate (optional component), the clay mineral (optional component), and the rare-earth metal (optional component) used when implementing the preparation method b-1 and the preparation method b-2 include those described above.

The preparation method b-1 prepares an aqueous slurry that includes the pentasil-type zeolite, the binder (e.g., silica sol or mono aluminum phosphate) (optional component), and the clay mineral (optional component).

For example, the desired homogenous aqueous slurry can be obtained by adding the silica sol to water, and mixing the mixture to prepare a homogenous binder aqueous solution, adding mono aluminum phosphate, the pentasil-type zeolite, and the clay mineral to the binder aqueous solution, and mixing the mixture.

Note that part or all of mono aluminum phosphate that is to be included in the aqueous slurry may be added (mixed) when preparing the binder aqueous solution.

The solid content in the aqueous slurry is preferably 5 to 60 mass %, and more preferably 10 to 50 mass %. When the solid content in the aqueous slurry is within the above range, an appropriate amount of water is evaporated when drying the aqueous slurry (i.e., the aqueous slurry can be easily dried). Moreover, the aqueous slurry can be easily handled while preventing an increase in viscosity of the aqueous slurry.

The preparation method b-1 then dries the aqueous slurry.

It is preferable to dry the aqueous slurry by spray drying. Microspheres (catalyst or catalyst precursor) can be obtained by drying the aqueous slurry by spray drying.

It is preferable to dry the aqueous slurry by spray drying using a spray dryer at a gas inlet temperature of 200 to 600° C. and a gas outlet temperature of 100 to 300° C.

It is preferable that the microspheres obtained by spray drying have a particle size of 20 to 150 μm and a water content of 5 to 30 mass %.

When the microspheres do not include excess alkali metals, soluble impurities, and the like, the microspheres may be used directly as the granulated catalyst B.

The preparation method b-1 may subject the microspheres obtained by drying the aqueous slurry to a washing treatment and an ion-exchange treatment using a known method to remove excess alkali metals, soluble impurities, and the like derived from the raw materials.

The washing treatment may be performed using water or aqueous ammonia. The soluble impurity content can be reduced by washing the microspheres using water or aqueous ammonia.

The ion-exchange treatment may be performed using an aqueous solution of an ammonium salt such as ammonium sulfate, ammonium sulfite, ammonium hydrogen sulfate, ammonium hydrogen sulfite, ammonium thiosulfate, ammonium nitrite, ammonium nitrate, ammonium phosphinate, ammonium phosphonate, ammonium phosphate, ammonium hydrogen phosphate, ammonium dihydrogen phosphate, ammonium carbonate, ammonium hydrogen carbonate, ammonium chloride, ammonium bromide, ammonium iodide, ammonium formate, ammonium acetate, or ammonium oxalate. The alkali metal (e.g., sodium and potassium) content in the microspheres can be reduced by performing the ion-exchange treatment.

The washing treatment is normally performed before performing the ion-exchange treatment. Note that the ion-exchange treatment may be performed before performing the washing treatment as long as the washing treatment and the ion-exchange treatment can be performed without problems.

It is preferable to perform the washing treatment and the ion-exchange treatment until the alkali metal content and the soluble impurity content are reduced to a value equal to or less than the desired value. The catalytic activity can be advantageously improved by reducing the alkali metal content and the soluble impurity content to a value equal to or less than the desired value.

When using the preparation method b-1, it is preferable that the microspheres have an alkali metal content of 1.0 mass % or less, and more preferably 0.5 mass % or less, and have a soluble impurity content of 2.0 mass % or less, and more preferably 1.5 mass % or less (on a dry catalyst basis).

It is preferable to dry the microspheres that have been subjected to the washing treatment and the ion-exchange treatment. In this case, the microspheres are preferably dried at a temperature of 100 to 500° C. until the microspheres have a water content of 1 to 25 mass %.

The preparation method b-1 can thus prepare the desired granulated catalyst B.

When using the preparation method b-1, the granulated catalyst B that includes the desired amounts (on a solid basis) of the pentasil-type zeolite, silicon derived from the silica sol (optional component), phosphorus and aluminum derived from mono aluminum phosphate (optional component), the clay mineral (optional component), and the like can be prepared by adjusting the amount of each raw material.

The granulated catalyst B that includes a rare-earth metal can be prepared using the preparation method b-2.

The preparation method b-2 further performs the ion-exchange treatment using a rare-earth metal source.

Examples of a rare-earth metal that is ion-exchanged using the rare-earth metal source include those mentioned above. Examples of the rare-earth metal source include chlorides, nitrates, sulfates, acetates, and the like of these rare-earth metals.

The ion-exchange treatment using the rare-earth metal source may be performed on the microspheres obtained by drying the aqueous slurry, or the microspheres that have been subjected to the washing treatment and the ion-exchange treatment (see the preparation method b-1).

The rare-earth metal may be incorporated in the microspheres by performing the ion-exchange treatment using the rare-earth metal source in accordance with a known method. For example, the microspheres may be subjected to the ion-exchange treatment using an aqueous solution that includes one type or two or more types of rare-earth metal compound (e.g., chloride, nitrate, sulfate, or acetate), or the microspheres may be impregnated with the aqueous solution, and optionally heated.

When using the preparation method b-2, the zeolite having a pentasil-type structure (pentasil-type zeolite) may be subjected to the ion-exchange treatment using the rare-earth metal source before preparing the aqueous slurry.

In this case, the zeolite having a pentasil-type structure is converted into a zeolite having a rare-earth metal-modified pentasil-type structure, and the aqueous slurry is prepared using the zeolite having a rare-earth metal-modified pentasil-type structure.

The zeolite having a pentasil-type structure may be subjected to the ion-exchange treatment using the rare-earth metal source (i.e., the rare-earth metal may be incorporated in the zeolite having a pentasil-type structure) in accordance with a known method. For example, the zeolite having a pentasil-type structure may be subjected to the ion-exchange treatment in a dry state or a wet state using an aqueous solution that includes one type or two or more types of rare-earth metal compound (e.g., chloride, nitrate, sulfate, or acetate), or may be impregnated with the aqueous solution, and optionally heated.

When the granulated catalyst B includes a rare-earth metal, decomposition of the zeolite crystals can be suppressed, and the durability of the catalyst can be improved.

The preparation method b-2 can thus prepare the desired granulated catalyst B.

When using the preparation method b-2, the granulated catalyst B that includes the desired amounts (on a solid basis) of the pentasil-type zeolite, the rare-earth metal, silicon derived from the silica sol (optional component), phosphorus and aluminum derived from mono aluminum phosphate (optional component), the clay mineral (optional component), and the like can be prepared by adjusting the amount of each raw material.

The granulated catalyst B can be used alone as a catalytic cracking catalyst (particularly a fluid catalytic cracking catalyst). Note that it is possible to produce a gasoline fraction having a high octane number in high yield while suppressing an increase in yield of a heavy distillate, and produce LPG having a high propylene content in high yield, by utilizing the catalytic cracking catalyst according to one embodiment of the invention that further includes a specific amount of the granulated catalyst A in addition to the granulated catalyst B.

The content of the granulated catalyst A in the catalytic cracking catalyst according to one embodiment of the invention is 90 to 99.9 mass %, preferably 90 to 99.5 mass %, and more preferably 90 to 99 mass %.

The content of the granulated catalyst B in the catalytic cracking catalyst according to one embodiment of the invention is 0.1 to 10 mass %, preferably 0.5 to 10 mass %, and more preferably 1 to 10 mass %.

When the content of the granulated catalyst A in the catalytic cracking catalyst according to one embodiment of the invention is within the above range, it is possible to produce a gasoline fraction having a high octane number while suppressing an increase in yield of a heavy distillate.

When the content of the granulated catalyst B in the catalytic cracking catalyst according to one embodiment of the invention is 0.1 mass % or more, it is possible to effectively increase the production of propylene when performing the catalytic cracking process. When the content of the granulated catalyst B is 10 mass % or less, an increase in the production of propylene corresponding to the amount of the catalyst can be achieved.

It is preferable that the total content of the granulated catalyst A and the granulated catalyst B in the catalytic cracking catalyst according to one embodiment of the invention be 90.1 to 100 mass %, more preferably 90.5 to 100 mass %, still more preferably 91.0 to 100 mass %, and most preferably 100 mass % (i.e., it is most preferable that the catalytic cracking catalyst include only the granulated catalyst A and the granulated catalyst B).

When the total content of the granulated catalyst A and the granulated catalyst B in the catalytic cracking catalyst according to one embodiment of the invention is within the above range, it is possible to easily produce a gasoline fraction having a high octane number while suppressing an increase in yield of a heavy distillate, and more effectively increase the production of propylene.

The mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B included in the catalytic cracking catalyst according to one embodiment of the invention is 0.015 to 3000, preferably 0.075 to 2000, and more preferably 0.15 to 1000.

When the mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B included in the catalytic cracking catalyst according to one embodiment of the invention is within the above range, it is possible to produce LPG having a high propylene content while suppressing an increase in yield of a heavy distillate.

The catalytic cracking catalyst according to one embodiment of the invention may be prepared by mixing the desired amounts of the granulated catalyst A and the granulated catalyst B so that the content of the granulated catalyst A and the content of the granulated catalyst B are within the above ranges.

The embodiments of the invention can thus provide a catalyst for catalytic cracking of a hydrocarbon oil, that can produce a gasoline fraction having a high octane number in high yield while suppressing an increase in yield of a heavy distillate, and produce LPG having a high propylene content in high yield. The catalytic cracking catalyst according to the embodiments of the invention can suitably be used as a fluid catalytic cracking catalyst.

A method for catalytic cracking of a hydrocarbon oil (hereinafter may be referred to as "catalytic cracking method") according to one embodiment of the invention is described below.

The method for catalytic cracking of a hydrocarbon oil according to one embodiment of the invention includes bringing the catalytic cracking catalyst according to one embodiment of the invention into contact with a hydrocarbon oil.

Examples of the hydrocarbon oil that is catalytically cracked using the catalytic cracking method according to one embodiment of the invention include a hydrocarbon oil (hydrocarbon mixture) that boils at a temperature equal to or higher than the boiling point of gasoline.

Examples of the hydrocarbon oil that boils at a temperature equal to or higher than the boiling point of gasoline include a light cycle oil, an atmospheric distillation residue, a vacuum distillation residue, and the like that are obtained by atmospheric or vacuum distillation of crude oil. Note that a coker gas oil, a solvent deasphalted oil, asphalt obtained by solvent deasphalting, tar sand oil, shale oil, a coal-derived liquid, gas-to-liquids (GTL) oil, a vegetable oil, a used lubricating oil, a waste food oil, and the like may also be used. It is also possible to use a hydrotreated oil obtained by subjecting a hydrocarbon oil to known hydrotreatment (i.e., hydrodesulfurization at a high temperature under high pressure in the presence of a hydrotreating catalyst (e.g., Ni—Mo-based catalyst, Co—Mo-based catalyst, Ni—Co—Mo-based catalyst, or Ni—W-based catalyst)).

The hydrocarbon oil may normally be catalytically cracked on a commercial scale by continuously circulating the catalytic cracking catalyst according to one embodiment of the invention through a catalytic cracker that includes a cracking reactor and a catalyst regenerator that are installed vertically.

Specifically, a high-temperature regenerated catalyst that is supplied from the catalyst regenerator is mixed with (brought into contact with) the hydrocarbon oil inside the cracking reactor to crack the hydrocarbon oil while guiding the catalyst upward inside the cracking reactor. The catalyst that has been deactivated by coke deposited on the surface of the catalyst as a result of catalytically cracking the hydrocarbon oil is separated from the cracking product, subjected to stripping, and supplied to the catalyst regenerator. The deactivated catalyst that has been supplied to the catalyst regenerator is regenerated by removing coke deposited on the catalyst through burning in air, and supplied to the cracking reactor.

The cracking product inside the cracking reactor that has been obtained by catalytic cracking is separated into one or more fractions such as dry gas, LPG, a gasoline fraction, LCO, and a heavy distillate. Needless to say, part or all of LCO or a heavy distillate separated from the cracking product may be re-circulated through the cracking reactor to effect a further cracking reaction.

The cracking reactor is preferably operated so that the reaction temperature is 400 to 600° C. (more preferably 450 to 550° C.), and the reaction pressure is normal pressure to 0.49 MPa (5 kg/cm$^2$) (more preferably normal pressure to 0.29 MPa (3 kg/cm$^2$). The mass ratio (catalytic cracking catalyst/hydrocarbon oil) of the catalytic cracking catalyst according to one embodiment of the invention to the hydrocarbon oil is preferably 2 to 20, and more preferably 4 to 15.

When the reaction temperature inside the cracking reactor is 400° C. or more, the cracking reaction of the hydrocarbon oil proceeds, and the cracking product can be advantageously obtained. When the reaction temperature inside the cracking reactor is 600° C. or less, the amount of light gas (e.g., dry gas and LPG) produced by cracking can be reduced, and the yield of the target gasoline fraction can be relatively increased (i.e., it is economical).

When the reaction pressure inside the cracking reactor is 0.49 MPa or less, the cracking reaction in which an increase in number of moles occurs is rarely hindered. When the mass ratio of the catalytic cracking catalyst according to one embodiment of the invention to the hydrocarbon oil is 2 or more, the catalyst concentration in the cracking reactor can be appropriately maintained, and the cracking reaction of the hydrocarbon oil proceeds advantageously. When the mass ratio of the catalytic cracking catalyst according to one embodiment of the invention to the hydrocarbon oil is 20 or less, the cracking reaction of the hydrocarbon oil effectively proceeds corresponding to an increase in catalyst concentration.

The embodiments of the invention can thus provide a method for catalytic cracking of a hydrocarbon oil using a catalyst for catalytic cracking of a hydrocarbon oil, that can produce a gasoline fraction having a high octane number in high yield, and produce LPG having a high propylene content in high yield. The method for catalytic cracking of a hydrocarbon oil according to the embodiments of the invention can suitably be implemented as a hydrocarbon oil fluid catalytic cracking method.

EXAMPLES

The invention is further described below by way of examples. Note that the following examples are for illustration purposes only, and the invention is not limited to the following examples.

Preparation of Catalyst

Preparation examples in which catalysts A1 to A13, comparative catalysts α1 to α5, and catalysts B1 to B5 were prepared, are described below. Note that the catalysts A1 to A13 correspond to the granulated catalyst A, the comparative catalysts α1 to α5 correspond to a comparative granulated catalyst, and the catalysts B1 to B5 correspond to the granulated catalyst B.

In the examples and comparative examples, the granulated catalyst A (catalysts A1 to A13) is appropriately referred to as "catalyst A", the comparative catalyst (comparative catalysts α1 to α5) is appropriately referred to as "comparative catalyst α", and the granulated catalyst B (catalysts B1 to B5) is appropriately referred to as "catalyst B".

In the preparation examples, an ultra-stable Y zeolite having the properties shown in Table 1 was used as a zeolite having a sodalite cage structure, a silica sol having a $SiO_2$ concentration of 29.0 mass % was used as a binder, kaolinite was used as a clay mineral, and mono aluminum phosphate having an $Al_2O_3 \cdot 3P_2O_5$ concentration of 46.2 mass % was used as mono aluminum phosphate.

TABLE 1

| | |
|---|---|
| Silica/alumina ratio (molar ratio) | 7.0 |
| Unit cell dimension (Å) | 24.55 |
| Al in framework/total Al (molar ratio) | 0.77 |

Preparation of Catalyst A1

20 g (on a dry basis ($SiO_2$ basis)) of the silica sol was diluted with 25% sulfuric acid, and the dilution was stirred to obtain a silica sol aqueous solution. Separately, distilled water was added to 20 g (on a dry basis) of the ultra-stable Y zeolite having the properties shown in Table 1 to prepare a zeolite slurry. 59.9 g (on a dry basis) of kaolinite and 0.1 g (on a dry basis ($Al_2O_3 \cdot 3P_2O_5$ basis)) of mono aluminum phosphate were added to the silica sol aqueous solution, and the mixture was mixed. After the addition of the zeolite slurry, the mixture was stirred for 10 minutes to prepare an aqueous slurry.

The aqueous slurry was spray-dried at an inlet temperature of 210° C. and an outlet temperature of 140° C. to obtain microspheres (i.e., catalyst precursor). The microspheres were subjected to an ion-exchange treatment twice using 3 L of a 5 mass % ammonium sulfate aqueous solution heated to 60° C., washed with 3 L of distilled water, and dried at 110° C. overnight inside a drier to obtain the target catalyst A1.

Preparation of Catalyst A2

20 g (on a dry basis ($SiO_2$ basis)) of the silica sol was diluted with 25% sulfuric acid, and the dilution was stirred to obtain a silica sol aqueous solution. Separately, distilled water was added to 30.0 g (on a dry basis) of the ultra-stable Y zeolite having the properties shown in Table 1 to prepare a zeolite slurry. 48.7 g (on a dry basis) of kaolinite and 1.0 g (on a dry basis ($Al_2O_3 \cdot 3P_2O_5$ basis)) of mono aluminum phosphate were added to the silica sol aqueous solution, and the mixture was mixed. After the addition of the zeolite slurry, the mixture was stirred for 10 minutes to prepare an aqueous slurry.

The aqueous slurry was spray-dried at an inlet temperature of 210° C. and an outlet temperature of 140° C. to obtain microspheres (i.e., catalyst precursor). The microspheres were subjected to an ion-exchange treatment twice using 3 L of a 5 mass % ammonium sulfate aqueous solution heated to 60° C., washed with 3 L of distilled water, and dried at 110° C. overnight inside a drier to obtain an intermediate 1.

The intermediate 1 was subjected to an ion-exchange treatment to include 0.3 g (on a dry basis (oxide basis)) of lanthanum (i.e., rare-earth metal) to obtain the target catalyst A2.

Preparation of Catalyst A3

The target catalyst A3 was obtained in the same manner as the catalyst A2, except that the amount of the ultra-stable Y zeolite having a sodalite cage structure was changed to 40.0 g (on a dry basis), the amount of mono aluminum phosphate was changed to 5.0 g (on a dry basis), the amount of kaolinite (clay mineral) was changed to 30.0 g (on a dry basis), and the intermediate was subjected to the ion-exchange treatment to include 5.0 g (on a dry basis (oxide basis)) of lanthanum.

Preparation of Catalyst A4

The target catalyst A4 was obtained in the same manner as the catalyst A1, except that the amount of the ultra-stable Y zeolite having a sodalite cage structure was changed to 40.0 g (on a dry basis), and the amount of kaolinite (clay mineral) was changed to 39.9 g (on a dry basis).

Preparation of Catalyst A5

The target catalyst A5 was obtained in the same manner as the catalyst A1, except that the amount of the ultra-stable Y zeolite having a sodalite cage structure was changed to 40.0 g (on a dry basis), the amount of mono aluminum phosphate was changed to 0.5 g (on a dry basis ($Al_2O_3 \cdot 3P_2O_5$ basis)), and the amount of kaolinite (clay mineral) was changed to 39.5 g (on a dry basis).

Preparation of Catalyst A6

The target catalyst A6 was obtained in the same manner as the catalyst A1, except that the amount of the ultra-stable Y zeolite having a sodalite cage structure was changed to 40.0 g (on a dry basis), the amount of mono aluminum phosphate was changed to 1.0 g (on a dry basis ($Al_2O_3 \cdot 3P_2O_5$ basis)), and the amount of kaolinite (clay mineral) was changed to 39.0 g (on a dry basis).

Preparation of catalyst A7

The target catalyst A7 was obtained in the same manner as the catalyst A1, except that the amount of the ultra-stable Y zeolite having a sodalite cage structure was changed to 40.0 g (on a dry basis), the amount of mono aluminum phosphate was changed to 21.0 g (on a dry basis ($Al_2O_3.3P_2O_5$ basis)), and the amount of kaolinite (clay mineral) was changed to 19.0 g (on a dry basis).

Preparation of Catalyst A8

The target catalyst A8 was obtained in the same manner as the catalyst A1, except that the amount of the ultra-stable Y zeolite having a sodalite cage structure was changed to 40.0 g (on a dry basis), the amount of mono aluminum phosphate was changed to 10.0 g (on a dry basis ($Al_2O_3.3P_2O_5$ basis)), and the amount of kaolinite (clay mineral) was changed to 30.0 g (on a dry basis).

Preparation of Catalyst A9

The target catalyst A9 was obtained in the same manner as the catalyst A1, except that the amount of the ultra-stable Y zeolite having a sodalite cage structure was changed to 40.0 g (on a dry basis), the amount of mono aluminum phosphate was changed to 5.0 g (on a dry basis ($Al_2O_3.3P_2O_5$ basis)), and the amount of kaolinite (clay mineral) was changed to 35.0 g (on a dry basis).

Preparation of Catalyst A10

The target catalyst A10 was obtained in the same manner as the catalyst A2, except that the amount of the ultra-stable Y zeolite having a sodalite cage structure was changed to 40.0 g (on a dry basis), the amount of mono aluminum phosphate was changed to 0.1 g (on a dry basis ($Al_2O_3.3P_2O_5$ basis)), and the amount of kaolinite (clay mineral) was changed to 39.6 g (on a dry basis).

Preparation of Catalyst A11

The target catalyst A11 was obtained in the same manner as the catalyst A2, except that the amount of the ultra-stable Y zeolite having a sodalite cage structure was changed to 20.0 g (on a dry basis), the amount of mono aluminum phosphate was changed to 21.0 g (on a dry basis ($Al_2O_3.3P_2O_5$ basis)), the amount of kaolinite (clay mineral) was changed to 29.0 g (on a dry basis), and the intermediate was subjected to the ion-exchange treatment to include 10.0 g (on a dry basis (oxide basis)) of lanthanum.

Preparation of Catalyst A12

The target catalyst A12 was obtained in the same manner as the catalyst A2, except that the amount of the ultra-stable Y zeolite having a sodalite cage structure was changed to 20.0 g (on a dry basis), the amount of mono aluminum phosphate was changed to 10.0 g (on a dry basis ($Al_2O_3.3P_2O_5$ basis)), the amount of kaolinite (clay mineral) was changed to 40.0 g (on a dry basis), and the intermediate was subjected to the ion-exchange treatment to include 10.0 g (on a dry basis (oxide basis)) of lanthanum.

Preparation of Catalyst A13

The target catalyst A13 was obtained in the same manner as the catalyst A2, except that the amount of the ultra-stable Y zeolite having a sodalite cage structure was changed to 20.0 g (on a dry basis), the amount of mono aluminum phosphate was changed to 5.0 g (on a dry basis ($Al_2O_3.3P_2O_5$ basis)), the amount of kaolinite (clay mineral) was changed to 50.0 g (on a dry basis), and the intermediate was subjected to the ion-exchange treatment to include 5.0 g (on a dry basis (oxide basis)) of lanthanum.

Preparation of Comparative Catalyst α1

The target comparative catalyst α1 was obtained in the same manner as the catalyst A2, except that the amount of mono aluminum phosphate was changed to 25.0 g (on a dry basis ($Al_2O_3.3P_2O_5$ basis)), and the amount of kaolinite (clay mineral) was changed to 24.7 g (on a dry basis).

Preparation of Comparative Catalyst α2

The target comparative catalyst α2 was obtained in the same manner as the catalyst A2, except that the amount of kaolinite (clay mineral) was changed to 37.0 g (on a dry basis), and the intermediate was subjected to the ion-exchange treatment to include 12.0 g (on a dry basis (oxide basis)) of lanthanum.

Preparation of Comparative Catalyst α3

The target comparative catalyst α3 was obtained in the same manner as the catalyst A2, except that the amount of mono aluminum phosphate was changed to 25.0 g (on a dry basis ($Al_2O_3.3P_2O_5$ basis)), the amount of the clay mineral was changed to 13.0 g (on a dry basis), and the intermediate was subjected to the ion-exchange treatment to include 12.0 g (on a dry basis (oxide basis)) of lanthanum.

Preparation of Comparative Catalyst α4

The target comparative catalyst α4 was obtained in the same manner as the catalyst A2, except that the amount of the ultra-stable Y zeolite having a sodalite cage structure was changed to 20.0 g (on a dry basis), the amount of mono aluminum phosphate was changed to 25.0 g (on a dry basis ($Al_2O_3.3P_2O_5$ basis)), the amount of kaolinite (clay mineral) was changed to 25.0 g (on a dry basis), and the intermediate was subjected to the ion-exchange treatment to include 10.0 g (on a dry basis (oxide basis)) of lanthanum.

Preparation of Comparative Catalyst α5

The target comparative catalyst α5 was obtained in the same manner as the catalyst A1, except that mono aluminum phosphate was not added, the amount of the ultra-stable Y zeolite having a sodalite cage structure was changed to 40.0 g (on a dry basis), and the amount of kaolinite (clay mineral) was changed to 40.0 g (on a dry basis).

Preparation of Catalyst B1

20.0 g (on a dry basis ($SiO_2$ basis)) of the silica sol was diluted with 25% sulfuric acid, and the dilution was stirred to obtain a silica sol aqueous solution. Separately, distilled water was added to 50.0 g (on a dry basis) of a pentasil-type zeolite having a silica/alumina ratio (molar ratio) of 7.0 to prepare a zeolite slurry.

30.0 g (on a dry basis) of kaolinite (clay mineral) was added to the silica sol aqueous solution, and the mixture was mixed. After the addition of the zeolite slurry, the mixture was stirred for 10 minutes to prepare an aqueous slurry.

The aqueous slurry was spray-dried at an inlet temperature of 210° C. and an outlet temperature of 140° C. to obtain microspheres (i.e., catalyst precursor). The microspheres were subjected to an ion-exchange treatment twice using 3

L of a 5 mass % ammonium sulfate aqueous solution heated to 60° C., washed with 3 L of distilled water, and dried at 110° C. overnight inside a drier to obtain the target catalyst B1.

Preparation of Catalyst B2

The target catalyst B2 was obtained in the same manner as the catalyst B1, except that the amount of the silica sol was changed to 65.0 g (on a dry basis ($SiO_2$ basis)), and the amount of the pentasil-type zeolite was changed to 5.0 g (on a dry basis).

Preparation of Catalyst B3

The target catalyst B3 was obtained in the same manner as the catalyst B1, except that the amount of the silica sol was changed to 45.0 g (on a dry basis ($SiO_2$ basis)), and the amount of the pentasil-type zeolite was changed to 25.0 g (on a dry basis).

In Tables 2 and 3, the item "Zeolite having a sodalite cage structure" indicates the content (on a dry basis) of the ultra-stable Y zeolite, the item "Binder" indicates the content (on a dry basis ($SiO_2$ basis)) of silicon derived from the silica sol, the item "Mono aluminum phosphate" indicates the content (on a dry basis ($Al_2O_3.3P_2O_5$ basis)) of mono aluminum phosphate, the item "Rare-earth metal" indicates the content (on a dry basis (oxide basis)) of the rare-earth metal, the item "Clay mineral" indicates the content (on a dry basis) of the clay mineral, and the item "Pentasil-type zeolite" indicates the content (on a dry basis) of the pentasil-type zeolite.

In Tables 2 and 3, the item "(Mono aluminum phosphate+ rare-earth metal)/zeolite having sodalite cage structure" indicates the mass ratio of the total content of mono aluminum phosphate and the rare-earth metal to the content of the zeolite (ultra-stable Y zeolite) having a sodalite cage structure (calculated using the above method).

TABLE 2

|  |  | Catalyst A1 | Catalyst A2 | Catalyst A3 | Catalyst A4 | Catalyst A5 | Catalyst A6 | Catalyst A7 | Catalyst A8 | Catalyst A9 |
|---|---|---|---|---|---|---|---|---|---|---|
| Zeolite having sodalite cage structure | mass % | 20 | 30 | 40 | 40 | 40 | 40 | 40 | 40 | 40 |
| Binder |  | 20 | 20 | 20 | 20 | 20 | 20 | 20 | 20 | 20 |
| Mono aluminum phosphate |  | 0.1 | 1 | 5 | 0.1 | 0.5 | 1 | 21 | 10 | 5 |
| Rare-earth metal |  | 0 | 0.3 | 5 | 0 | 0 | 0 | 0 | 0 | 0 |
| Clay mineral |  | 59.9 | 48.7 | 30 | 39.9 | 39.5 | 39 | 19 | 30 | 35 |
| (Mono aluminum phosphate + rare-earth metal)/ zeolite having sodalite cage structure | mass ratio | 0.005 | 0.043 | 0.250 | 0.003 | 0.013 | 0.025 | 0.525 | 0.250 | 0.125 |

|  |  | Catalyst A10 | Catalyst A11 | Catalyst A12 | Catalyst A13 | Comparative catalyst α1 | Comparative catalyst α2 | Comparative catalyst α3 | Comparative catalyst α4 | Comparative catalyst α5 |
|---|---|---|---|---|---|---|---|---|---|---|
| Zeolite having sodalite cage structure | mass % | 40 | 20 | 20 | 20 | 30 | 30 | 30 | 20 | 40 |
| Binder |  | 20 | 20 | 20 | 20 | 20 | 20 | 20 | 20 | 20 |
| Mono aluminum phosphate |  | 0.1 | 21 | 10 | 5 | 25 | 1 | 25 | 25 | 0 |
| Rare-earth metal |  | 0.3 | 10 | 10 | 5 | 0.3 | 12 | 12 | 10 | 0 |
| Clay mineral |  | 39.6 | 29 | 40 | 50 | 24.7 | 37 | 13 | 25 | 40 |
| (Mono aluminum phosphate + rare-earth metal)/ zeolite having sodalite cage structure | mass ratio | 0.010 | 1.550 | 1.000 | 0.500 | 0.843 | 0.433 | 1.233 | 1.750 | 0 |

Preparation of Catalyst B4

The target catalyst B4 was obtained in the same manner as the catalyst B1, except that the amount of the pentasil-type zeolite was changed to 60.0 g (on a dry basis), and the amount of kaolinite (clay mineral) was changed to 20.0 g (on a dry basis).

Preparation of Catalyst B5

The target catalyst B5 was obtained in the same manner as the catalyst B1, except that the amount of the pentasil-type zeolite was changed to 7.0 g (on a dry basis), and the amount of kaolinite (clay mineral) was changed to 73.0 g (on a dry basis).

Tables 2 and 3 show the composition of the catalysts A1 to A13, the comparative catalysts α1 to α5, and the catalysts B1 to B5.

TABLE 3

|  |  | Catalyst B1 | Catalyst B2 | Catalyst B3 | Catalyst B4 | Catalyst B5 |
|---|---|---|---|---|---|---|
| Pentasil-type zeolite | mass % | 50 | 5 | 25 | 60 | 7 |
| Binder |  | 20 | 65 | 45 | 20 | 20 |
| Clay mineral |  | 30 | 30 | 30 | 20 | 73 |

Examples 1 to 17 and Comparative Examples 1 to 14

The catalysts A1 to A13, the comparative catalysts α1 to α5, and the catalysts B1 to B5 were mixed in the combination and the ratio shown in Tables 4 to 7 to prepare catalysts for catalytic cracking of a hydrocarbon oil (catalytic cracking catalysts) of Examples 1 to 17 and Comparative Examples 1 to 14.

In Tables 4 to 7, the item "Mono aluminum phosphate in catalyst A/pentasil-type zeolite in catalyst B" indicates the mass ratio of the content (on a dry basis ($Al_2O_3 \cdot 3P_2O_5$ basis)) of phosphorus and aluminum derived from mono aluminum phosphate included in the catalyst A to the content (on a dry basis) of the pentasil-type zeolite included in the catalyst B (calculated using the above method), the item "Mono aluminum phosphate in comparative catalyst α/pentasil-type zeolite in catalyst B" indicates the mass ratio of the content (on a dry basis ($Al_2O_3 \cdot 3P_2O_5$ basis)) of phosphorus and aluminum derived from mono aluminum phosphate included in the comparative catalyst α to the content (on a dry basis) of the pentasil-type zeolite included in the catalyst B (calculated using the above method), and the item "Mono aluminum phosphate in catalyst A or comparative catalyst α/pentasil-type zeolite in catalyst B" indicates the mass ratio of the content (on a dry basis ($Al_2O_3 \cdot 3P_2O_5$ basis)) of phosphorus and aluminum derived from mono aluminum phosphate included in the catalyst A or the comparative catalyst α to the content (on a dry basis) of the pentasil-type zeolite included in the catalyst B (calculated using the above method).

TABLE 4

| | | | Example 1 | Example 2 | Example 3 | Example 4 | Example 5 | Example 6 | Example 7 | Example 8 | Example 9 |
|---|---|---|---|---|---|---|---|---|---|---|---|
| Catalyst combination | Catalyst name (catalyst A) | | Catalyst A1 | Catalyst A2 | Catalyst A3 | Catalyst A2 | Catalyst A2 | Catalyst A2 | Catalyst A2 | Catalyst A4 | Catalyst A5 |
| | Catalyst name (catalyst B) | | Catalyst B1 | Catalyst B1 | Catalyst B1 | Catalyst B2 | Catalyst B3 | Catalyst B1 | Catalyst B1 | Catalyst B4 | Catalyst B4 |
| | Catalyst A/catalyst B (mass ratio) | | 99.5/0.5 | 99.5/0.5 | 99.5/0.5 | 99.5/0.5 | 99.5/0.5 | 99/1 | 90/10 | 90/10 | 90/10 |
| Composition of catalyst A | Zeolite having sodalite cage structure | mass % | 20 | 30 | 40 | 30 | 30 | 30 | 30 | 40 | 40 |
| | Binder | | 20 | 20 | 20 | 20 | 20 | 20 | 20 | 20 | 20 |
| | Mono aluminum phosphate | | 0.1 | 1 | 5 | 1 | 1 | 1 | 1 | 0.1 | 0.5 |
| | Rare-earth metal | | 0 | 0.3 | 5 | 0.3 | 0.3 | 0.3 | 0.3 | 0 | 0 |
| | Clay mineral | | 59.9 | 48.7 | 30 | 48.7 | 48.7 | 48.7 | 48.7 | 39.9 | 39.5 |
| | (Mono aluminum phosphate + rare-earth metal)/zeolite having sodalite cage structure | mass ratio | 0.005 | 0.043 | 0.250 | 0.043 | 0.043 | 0.043 | 0.043 | 0.003 | 0.013 |
| Composition of catalyst B | Pentasil-type zeolite | mass % | 50 | 50 | 50 | 5 | 25 | 50 | 50 | 60 | 60 |
| | Binder | | 20 | 20 | 20 | 65 | 45 | 20 | 20 | 20 | 20 |
| | Clay mineral | | 30 | 30 | 30 | 30 | 30 | 30 | 30 | 20 | 20 |
| Mono aluminum phosphate in catalyst A/pentasil-type zeolite in catalyst B | | mass ratio | 0.398 | 3.98 | 19.9 | 39.8 | 7.96 | 1.98 | 0.18 | 0.015 | 0.075 |

TABLE 5

| | | | Example 10 | Example 11 | Example 12 | Example 13 | Example 14 | Example 15 | Example 16 | Example 17 |
|---|---|---|---|---|---|---|---|---|---|---|
| Catalyst combination | Catalyst name (catalyst A) | | Catalyst A6 | Catalyst A7 | Catalyst A8 | Catalyst A9 | Catalyst A10 | Catalyst A11 | Catalyst A12 | Catalyst A13 |
| | Catalyst name (catalyst B) | | Catalyst B4 | Catalyst B5 | Catalyst B2 | Catalyst B2 | Catalyst B1 | Catalyst B1 | Catalyst B1 | Catalyst B1 |
| | Catalyst A/catalyst B (mass ratio) | | 99/10 | 99.9/0.1 | 99.9/0.1 | 99.9/0.1 | 90/10 | 90/10 | 90/10 | 90/10 |
| Composition of catalyst A | Zeolite having sodalite cage structure | mass % | 40 | 40 | 40 | 40 | 40 | 20 | 20 | 20 |
| | Binder | | 20 | 20 | 20 | 20 | 20 | 20 | 20 | 20 |
| | Mono aluminum phosphate | | 1 | 21 | 10 | 5 | 0.1 | 21 | 10 | 5 |
| | Rare-earth metal | | 0 | 0 | 0 | 0 | 0.3 | 10 | 10 | 5 |
| | Clay mineral | | 39 | 19 | 30 | 35 | 39.6 | 29 | 40 | 50 |
| | (Mono aluminum phosphate + rare-earth metal)/zeolite having sodalite cage structure | mass ratio | 0.025 | 0.525 | 0.250 | 0.125 | 0.010 | 1.550 | 1.000 | 0.500 |
| Composition of catalyst B | Pentasil-type zeolite | mass % | 60 | 7 | 5 | 5 | 50 | 50 | 50 | 50 |
| | Binder | | 20 | 20 | 65 | 65 | 20 | 20 | 20 | 20 |
| | Clay mineral | | 20 | 73 | 30 | 30 | 30 | 30 | 30 | 30 |
| Mono aluminum phosphate in catalyst A/pentasil-type zeolite in catalyst B | | mass ratio | 0.15 | 2997 | 1998 | 999 | 0.018 | 3.78 | 1.8 | 0.9 |

TABLE 6

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Catalyst combination | Catalyst name (comparative catalyst α) | Comparative catalyst α1 | Comparative catalyst α2 | Comparative catalyst α3 | Comparative catalyst α3 | Comparative catalyst α3 | Comparative catalyst α3 | Comparative catalyst α3 |
| | Catalyst name (catalyst B) | Catalyst B1 | Catalyst B1 | Catalyst B1 | Catalyst B2 | Catalyst B3 | Catalyst B1 | Catalyst B1 |

TABLE 6-continued

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
|  | Comparative catalyst α/catalyst B (mass ratio) |  | 99.5/0.5 | 99.5/0.5 | 99.5/0.5 | 99.5/0.5 | 99.5/0.5 | 99/1 | 90/10 |
| Composition of comparative catalyst α | Zeolite having sodalite cage structure | mass % | 30 | 30 | 30 | 30 | 30 | 30 | 30 |
|  | Binder |  | 20 | 20 | 20 | 20 | 20 | 20 | 20 |
|  | Mono aluminum phosphate |  | 25 | 1 | 25 | 25 | 25 | 25 | 25 |
|  | Rare-earth metal |  | 0.3 | 12 | 12 | 12 | 12 | 12 | 12 |
|  | Clay mineral |  | 24.7 | 37 | 13 | 13 | 13 | 13 | 13 |
|  | (Mono aluminum phosphate + rare-earth metal)/zeolite having sodalite cage structure | mass ratio | 0.843 | 0.433 | 1.233 | 1.233 | 1.233 | 1.233 | 1.233 |
| Composition of catalyst B | Pentasil-type zeolite | mass % | 50 | 50 | 50 | 5 | 25 | 50 | 50 |
|  | Binder |  | 20 | 20 | 20 | 65 | 45 | 20 | 20 |
|  | Clay mineral |  | 30 | 30 | 30 | 30 | 30 | 30 | 30 |
| Mono aluminum phosphate in comparative catalyst α/ pentasil-type zeolite in catalyst B (mass ratio) | | mass ratio | 99.5 | 3.98 | 99.5 | 995 | 199 | 49.5 | 4.5 |

TABLE 7

|  |  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Catalyst combination | Catalyst name (catalyst A or comparative catalyst α) |  | Comparative catalyst α1 | Catalyst A1 | Comparative catalyst α4 | Comparative catalyst α5 | Catalyst A11 | Catalyst A1 | Catalyst A7 |
|  | Catalyst name (catalyst B) |  | Catalyst B2 | Catalyst B4 | Catalyst B1 | Catalyst B1 | Catalyst B2 | — | — |
|  | Catalyst A or comparative catalyst α/catalyst B (mass ratio) |  | 99.9/0.1 | 80/20 | 90/10 | 90/10 | 99.9/0.1 | — | — |
| Composition of catalyst A or comparative catalyst α | Zeolite having sodalite cage structure | mass % | 30 | 20 | 20 | 40 | 20 | 20 | 40 |
|  | Binder |  | 20 | 20 | 20 | 20 | 20 | 20 | 20 |
|  | Mono aluminum phosphate |  | 25 | 0.1 | 25 | 0 | 21 | 0.1 | 21 |
|  | Rare-earth metal |  | 0.3 | 0 | 10 | 0 | 10 | 0 | 0 |
|  | Clay mineral |  | 24.7 | 59.9 | 25 | 40 | 29 | 59.9 | 19 |
|  | (Mono aluminum phosphate + rare-earth metal)/zeolite having sodalite cage structure | mass ratio | 0.843 | 0.005 | 1.750 | 0.000 | 1.550 | 0.005 | 0.525 |
| Composition of catalyst B | Pentasil-type zeolite | mass % | 5 | 60 | 50 | 50 | 5 | — | — |
|  | Binder |  | 65 | 20 | 20 | 20 | 65 | — | — |
|  | Clay mineral |  | 30 | 20 | 30 | 30 | 30 | — | — |
| Mono aluminum phosphate in catalyst A or comparative catalyst α/pentasil-type zeolite in catalyst B (mass ratio) | | mass ratio | 4995 | 0.0067 | 4.5 | 0 | 4196 | — | — |

Fluid Catalytic Cracking

An identical feedstock was catalytically cracked under identical conditions using the catalytic cracking catalysts prepared in Examples 1 to 17 and Comparative Examples 1 to 14 utilizing a bench-scale plant (i.e., a fluidized-bed catalytic cracker including a reactor and a catalyst regenerator).

In order to simulate the actual usage state (equilibration), each of the catalytic cracking catalysts prepared in Examples 1 to 17 and Comparative Examples 1 to 14 was dried at 500° C. for 5 hours, allowed to absorb a cyclohexane solution including nickel naphthenate and vanadium naphthenate to have a nickel content of 1000 mass ppm and a vanadium content of 2000 mass ppm, dried, calcined at 500° C. for 5 hours, and allowed to stand at 785° C. for 6 hours in a 100% water vapor atmosphere.

A hydrocarbon oil having the properties shown in Table 8 that was obtained by mixing 50 vol % of a desulfurized vacuum gas oil (VGO) and 50 vol % of a desulfurization residue (DDSP) was catalytically cracked using each catalytic cracking catalyst under the reaction conditions shown in Table 9 while changing the catalyst/feed ratio (mass ratio) to 6, 8, 10, and 12.

TABLE 8

| Oil type | Desulfurized vacuum gas oil (VGO) (50 vol %) + desulfurization residue (DDSP) (50 vol %) |
|---|---|
| Density (15° C.) (g/cm$^3$) | 0.9032 |
| Kinematic viscosity (40° C.) (mm$^2$/s) | 67.06 |
| Residual carbon content (mass %) | 1.07 |
| Vacuum distillation properties | |
| Initial boiling point (° C.) | 305 |
| 10% distillation temperature (° C.) | 381 |
| 50% distillation temperature (° C.) | 457 |
| 95% distillation temperature (° C.) | 582 |
| End point (° C.) | 598 |

TABLE 9

| Reaction temperature (° C.) | 510 |
|---|---|
| Catalyst regeneration temperature (° C.) | 650 |
| Catalyst circulation amount (g/min) | 60 |
| Catalyst/feedstock (mass ratio) | 6, 8, 10, or 12 |

Results of Catalytic Cracking Reaction Achieved by Catalyst

The amounts of a gasoline fraction (boiling point: 25 to 190° C.), a middle distillate (LCO (boiling point: 190 to 350° C.)), and a heavy distillate (boiling point: 350° C. or more) that were produced under the above cracking conditions were determined by a gas chromatography-distillation method using an analyzer ("AC Sumdis Analyzer" manufactured by Agilent Technologies). The amounts of LPG (i.e., hydrocarbons having 3 or 4 carbon atoms) and propylene included in LPG that were produced under the above cracking conditions were determined using a gas chromatograph ("GC-4000" manufactured by GL Sciences Inc.) to calculate the content of propylene in LPG The amount of coke produced under the above cracking conditions was calculated by determining the amounts of carbon monoxide and carbon dioxide produced during catalyst regeneration using a gas chromatograph ("GC-3200" manufactured by GL Sciences Inc.), and calculating the amount of carbon that was burned during catalyst regeneration. The octane number (GC-RON based on gas chromatography) of the gasoline fraction was calculated using an analyzer ("PONA analyzer" manufactured by Hewlett-Packard Company).

The amount of each product and the octane number (RON) of the gasoline fraction were determined corresponding to each of the four catalyst/feedstock ratios.

A correlation formula of the catalyst/feedstock ratio and the ratio (mass %) of each product, and a correlation formula of the catalyst/feedstock ratio and the octane number (RON) of the gasoline fraction were determined using the least-square method based on the resulting data.

The catalyst/feedstock ratio $R_1$ when the ratio of coke was 5 mass % was determined using the correlation formula of the catalyst/feedstock ratio and the ratio (mass %) of coke, the ratio of each product when the catalyst/feedstock ratio was $R_1$ was calculated as the yield (mass %) of each product using the correlation formula of the catalyst/feedstock ratio and the ratio (mass %) of each product other than coke, and the octane number (RON) of the gasoline fraction when the catalyst/feedstock ratio was $R_1$ was calculated using the correlation formula of the catalyst/feedstock ratio and the octane number (RON) of the gasoline fraction.

Tables 10 to 13 show the yield (mass %) of LPG, the yield (mass %) of the gasoline fraction, the yield (mass %) of the heavy distillate, the content (mass %) of propylene in LPG, and the octane number (RON) of the gasoline fraction obtained in Examples 1 to 17 and Comparative Examples 1 to 14 (when the ratio of coke was 5 mass %).

TABLE 10

|  | Example 1 | Example 2 | Example 3 | Example 4 | Example 5 | Example 6 | Example 7 | Example 8 | Example 9 |
|---|---|---|---|---|---|---|---|---|---|
| Catalyst name (catalyst A) | A1 | A2 | A3 | A2 | A2 | A2 | A2 | A4 | A5 |
| Catalyst name (catalyst B) | B1 | B1 | B1 | B2 | B3 | B1 | B1 | B4 | B4 |
| Catalyst A/catalyst B (mass ratio) | 99.5/0.5 | 99.5/0.5 | 99.5/0.5 | 99.5/0.5 | 99.5/0.5 | 99/1 | 90/10 | 90/10 | 90/10 |
| (Mono aluminum phosphate + rare-earth metal)/zeolite having sodalite cage structure (mass ratio) | 0.005 | 0.043 | 0.250 | 0.043 | 0.043 | 0.043 | 0.043 | 0.003 | 0.013 |
| Mono aluminum phosphate in catalyst A/pentasil-type zeolite in catalyst B (mass ratio) | 0.398 | 3.98 | 19.9 | 39.8 | 7.96 | 1.98 | 0.18 | 0.015 | 0.075 |
| Yield and properties of product oil | | | | | | | | | |
| LPG mass % | 22.5 | 23.2 | 23.7 | 22.6 | 23.0 | 25.3 | 32.1 | 32.5 | 23.5 |
| Gasoline fraction | 58.0 | 57.9 | 57.2 | 57.9 | 57.0 | 56.3 | 52.9 | 53.0 | 58.0 |
| Heavy distillate | 7.8 | 7.7 | 7.7 | 7.8 | 7.7 | 7.8 | 7.9 | 7.9 | 8.2 |
| Content of propylene in LPG | 31.1 | 31.5 | 30.0 | 30.1 | 30.4 | 32.0 | 33.6 | 33.5 | 30.6 |
| Octane number (RON) of gasoline fraction | 90.8 | 90.8 | 90.4 | 90.8 | 90.8 | 90.9 | 91.2 | 91.1 | 90.9 |

TABLE 11

|  | Example 10 | Example 11 | Example 12 | Example 13 | Example 14 | Example 15 | Example 16 | Example 17 |
|---|---|---|---|---|---|---|---|---|
| Catalyst name (catalyst A) | A6 | A7 | A8 | A9 | A10 | A11 | A12 | A13 |
| Catalyst name (catalyst B) | B4 | B5 | B2 | B2 | B1 | B1 | B1 | B1 |
| Catalyst A/catalyst B (mass ratio) | 90/10 | 99.9/0.1 | 99.9/0.1 | 99.9/0.1 | 90/10 | 90/10 | 90/10 | 90/10 |
| (Mono aluminum phosphate + rare-earth metal)/zeolite having sodalite cage structure (mass ratio) | 0.025 | 0.525 | 0.250 | 0.125 | 0.010 | 1.550 | 1.000 | 0.500 |
| Mono aluminum phosphate in catalyst A/pentasil-type zeolite in catalyst B (mass ratio) | 0.15 | 2997 | 1998 | 999 | 0.018 | 3.78 | 1.8 | 0.9 |
| Yield and properties of product oil | | | | | | | | |
| LPG mass % | 23.4 | 23.4 | 30.7 | 30.0 | 32.7 | 32.3 | 32.6 | 32.9 |
| Gasoline fraction | 58.0 | 57.9 | 54.0 | 54.2 | 52.7 | 53.1 | 52.8 | 52.5 |
| Heavy distillate | 8.0 | 7.8 | 8.1 | 7.9 | 7.9 | 8.0 | 7.9 | 7.9 |
| Content of propylene in LPG | 30.8 | 30.3 | 30.0 | 30.0 | 34.3 | 31.0 | 33.4 | 34.7 |
| Octane number (RON) of gasoline fraction | 90.7 | 90.9 | 91.1 | 91.0 | 91.2 | 91.0 | 91.1 | 91.4 |

TABLE 12

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Catalyst name (comparative catalyst α) | Comparative catalyst α1 | Comparative catalyst α2 | Comparative catalyst α3 | Comparative catalyst α3 | Comparative catalyst α3 | Comparative catalyst α3 | Comparative catalyst α3 |
| Catalyst name (catalyst B) | Catalyst B1 | Catalyst B1 | Catalyst B1 | Catalyst B2 | Catalyst B3 | Catalyst B1 | Catalyst B1 |
| Comparative catalyst α/catalyst B (mass ratio) | 99.5/0.5 | 99.5/0.5 | 99.5/0.5 | 99.5/0.5 | 99.5/0.5 | 99/1 | 90/10 |
| (Mono aluminum phosphate + rare-earth metal)/zeolite having sodalite cage structure (mass ratio) | 0.843 | 0.433 | 1.233 | 1.233 | 1.233 | 1.233 | 1.233 |
| Mono aluminum phosphate in comparative catalyst α/pentasil-type zeolite in catalyst B (mass ratio) | 99.5 | 3.98 | 99.5 | 995 | 199 | 49.5 | 4.5 |
| Yield and properties of product oil | | | | | | | |
| LPG          mass % | 23.9 | 24.3 | 24.7 | 23.9 | 24.3 | 27.5 | 34.6 |
| Gasoline fraction | 55.9 | 55.4 | 54.3 | 55.1 | 54.7 | 51.9 | 50.6 |
| Heavy distillate | 8.2 | 7.4 | 8.1 | 8.1 | 8.0 | 8.4 | 8.7 |
| Content of propylene in LPG | 30.5 | 28.0 | 25.9 | 26.0 | 25.4 | 27.9 | 24.6 |
| Octane number (RON) of gasoline fraction | 89.2 | 87.6 | 87.0 | 86.9 | 87.3 | 87.7 | 88.5 |

TABLE 13

|  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Catalyst name (catalyst A or comparative catalyst α) | Comparative catalyst α1 | Catalyst A1 | Comparative catalyst α4 | Comparative catalyst α5 | Catalyst A11 | Catalyst A1 | Catalyst A7 |
| Catalyst name (catalyst B) | Catalyst B2 | Catalyst B4 | Catalyst B1 | Catalyst B1 | Catalyst B2 | — | — |
| Catalyst A or comparative catalyst α/catalyst B (mass ratio) | 99.9/0.1 | 80/20 | 90/10 | 90/10 | 99.9/0.1 | — | — |
| (Mono aluminum phosphate + rare-earth metal)/zeolite having sodalite cage structure (mass ratio) | 0.843 | 0.005 | 1.750 | 0.000 | 1.550 | 0.005 | 0.525 |
| Mono aluminum phosphate in catalyst A or comparative catalyst α/pentasil-type zeolite in catalyst B (mass ratio) | 4995 | 0.0067 | 4.5 | 0 | 4196 | — | — |
| Yield and properties of product oil | | | | | | | |
| LPG          mass % | 23.5 | 31.1 | 29.7 | 30.5 | 23.3 | 23.3 | 23.2 |
| Gasoline fraction | 55.3 | 53.1 | 51.5 | 53.8 | 55.7 | 55.7 | 55.7 |
| Heavy distillate | 8.2 | 8.5 | 8.1 | 8.3 | 7.2 | 7.2 | 7.2 |
| Content of propylene in LPG | 25.5 | 30.2 | 26.6 | 32.1 | 24.5 | 24.5 | 24.1 |
| Octane number (RON) of gasoline fraction | 88.1 | 91.1 | 86.3 | 90.9 | 89.0 | 89.0 | 88.9 |

In Examples 1 to 17, a gasoline fraction having a high octane number (RON) could be produced in high yield while suppressing an increase in yield of a heavy distillate, and LPG having a high propylene content could be produced in high yield (see Tables 10 and 11).

As shown in Tables 10 and 11, a gasoline fraction having a high octane number (RON) could be obtained when the mass ratio ((sum of content (on an $Al_2O_3 \cdot 3P_2O_5$ basis) of phosphorus and aluminum derived from mono aluminum phosphate and content (on an oxide basis) of rare-earth metal)/content of zeolite having sodalite cage structure) of the sum of the content (on an $Al_2O_3 \cdot 3P_2O_5$ basis) of phosphorus and aluminum derived from mono aluminum phosphate and the content (on an oxide basis) of the rare-earth metal to the content of the zeolite having a sodalite cage structure was 0.003 to 1.55 (Examples 1 to 17).

As shown in Tables 10 and 12, the selectivity for propylene (i.e., the content of propylene in LPG) was high, and a gasoline fraction having a high octane number (RON) could be obtained in Example 2 in which the catalyst A2 (granulated catalyst A) including specific amounts of mono aluminum phosphate and the rare-earth metal was used, as compared with Comparative Examples 1 to 3 in which the comparative catalysts α1 to α3, in which the content of mono aluminum phosphate or the rare-earth metal was outside the above range, were respectively used.

It is considered from these comparison results that a hydrogen transfer reaction that decreases the octane number was suppressed since the granulated catalyst A included specific amounts of mono aluminum phosphate and the rare-earth metal, and a larger amount of olefin fraction remained, whereby the yield of propylene, and the octane number of the gasoline fraction increased.

As is clear from the comparison between Example 4 and Comparative Example 4, and the comparison between Example 5 and Comparative Example 5, since the catalytic cracking catalysts prepared in Examples 4 and 5 included the catalyst A2 including specific amounts of mono aluminum phosphate and the rare-earth metal, the selectivity for propylene (i.e., the content of propylene in LPG) was high, and a gasoline fraction having a high octane number could be obtained even when the content of the pentasil-type zeolite was changed within a specific range (see Tables 10 and 12).

As shown in Tables 10, 12, and 13, LPG with high selectivity for propylene (i.e., the content of propylene in LPG) could be obtained, the yield of the heavy distillate was low, and a gasoline fraction having a high octane number could be obtained in Examples 6 and 7 in which the catalyst A2 including specific amounts of mono aluminum phosphate and the rare-earth metal was used, as compared with Comparative Examples 6 and 7 in which the comparative catalyst α3, in which the content of mono aluminum phosphate and the rare-earth metal was outside the above range, was used.

It is considered from these comparison results that the zeolite having a sodalite cage structure included in the catalyst A as the main active component was stabilized, and the yield of the heavy distillate decreased since the granulated catalyst A included mono aluminum phosphate and the rare-earth metal within specific ranges. It is also considered that the octane number of the gasoline fraction increased since a hydrogen transfer reaction that decreases the octane number was suppressed.

In Comparative Examples 8 and 9, the yield of the heavy distillate could not be reduced (Comparative Examples 8 and 9), and/or the selectivity for propylene (i.e., the content of propylene in LPG) was low (Comparative Example 8), since the mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B was outside the range of 0.015 to 3000 (see Table 13).

In Comparative Examples 10 and 11, the yield of the heavy distillate could not be reduced (Comparative Examples 10 and 11), and/or the selectivity for propylene (i.e., the content of propylene in LPG) decreased due to a hydrogen transfer reaction (Comparative Example 10), since the mass ratio ((sum of content (on an $Al_2O_3 \cdot 3P_2O_5$ basis) of phosphorus and aluminum derived from mono aluminum phosphate and content (on an oxide basis) of rare-earth metal)/content of zeolite having sodalite cage structure) of the sum of the content (on an $Al_2O_3 \cdot 3P_2O_5$ basis) of phosphorus and aluminum derived from mono aluminum phosphate and the content (on an oxide basis) of the rare-earth metal to the content of the zeolite having a sodalite cage structure was outside the range of 0.003 to 1.55 (see Table 13).

In Comparative Example 12, the yield of the heavy distillate was low, but the selectivity for propylene (i.e., the content of propylene in LPG) was low, the yield of LPG was low, and the gasoline fraction had a low octane number, since the mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B was outside the range of 0.015 to 3000, although the catalyst A11 and the catalyst B2 including each component in a specific ratio were used (see Table 13).

Since the catalytic cracking catalysts prepared in Comparative Examples 13 and 14 did not include the granulated catalyst B, the selectivity for propylene (i.e., the content of propylene in LPG) was low, the yield of LPG was low, and the gasoline fraction had a low octane number, although the yield of the heavy distillate was low (see Table 13).

INDUSTRIAL APPLICABILITY

The embodiments of the invention can thus provide a catalyst for catalytic cracking of a hydrocarbon oil, that can produce a gasoline fraction having a high octane number in high yield while suppressing an increase in yield of a heavy distillate, and produce LPG having a high propylene content in high yield, and a method for catalytic cracking of a hydrocarbon oil using the catalyst.

The invention claimed is:

1. A catalyst for catalytic cracking of a hydrocarbon oil, the catalyst comprising:
   a granulated catalyst A that comprises 20 to 50 mass % of zeolite having a sodalite cage structure, 10 to 30 mass % (on a $SiO_2$ basis) of silicon derived from a silica sol, 0.1 to 21 mass % (on an $Al_2O_3 \cdot 3P_2O_5$ basis) of phosphorus and aluminum derived from mono aluminum phosphate, 5 to 65 mass % of a clay mineral, and 0 to 10 mass % (on an oxide basis) of a rare-earth metal; and
   a granulated catalyst B that comprises 1 to 70 mass % of a pentasil-type zeolite,
   the content of the granulated catalyst A and the content of the granulated catalyst B in the catalyst being 90 to 99.9 mass % and 0.1 to 10 mass %, respectively, and
   the mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B being 0.015 to 3000.

2. The catalyst according to claim 1, wherein the granulated catalyst A comprises the zeolite having a sodalite cage structure, phosphorus and aluminum derived from mono aluminum phosphate, and the rare-earth metal so that the mass ratio ((sum of content (on an $Al_2O_3 \cdot 3P_2O_5$ basis) of phosphorus and aluminum derived from mono aluminum phosphate and content (on an oxide basis) of rare-earth metal)/content of zeolite having a sodalite cage structure) of the sum of the content (on an $Al_2O_3 \cdot 3P_2O_5$ basis) of phosphorus and aluminum derived from mono aluminum phosphate and the content (on an oxide basis) of the rare-earth metal to the content of the zeolite having a sodalite cage structure is 0.003 to 1.55.

3. A method for catalytic cracking of a hydrocarbon oil comprising bringing the catalyst according to claim 1 into contact with a hydrocarbon oil.

4. A method for catalytic cracking of a hydrocarbon oil comprising bringing the catalyst according to claim 2 into contact with a hydrocarbon oil.

5. The catalyst according to claim 1, wherein the content of the granulated catalyst A is 99 to 99.9 mass %, and the content of the granulated catalyst B is 0.1 to 1 mass %.

6. The catalyst according to claim 1, wherein the mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B is 0.075 to 2000.

7. The catalyst according to claim 1, wherein the mass ratio (mass (on an $Al_2O_3 \cdot 3P_2O_5$ basis) of phosphorus and aluminum derived from mono aluminum phosphate included in granulated catalyst A/mass of pentasil-type zeolite included in granulated catalyst B) of the mass (on an $Al_2O_3 \cdot 3P_2O_5$ basis) of phosphorus and aluminum derived from mono aluminum phosphate included in the granulated catalyst A to the mass of the pentasil-type zeolite included in the granulated catalyst B is 0.015 to 1000.

8. The catalyst according to claim 1, wherein the granulated catalyst A comprises the zeolite having a sodalite cage structure, phosphorus and aluminum derived from mono aluminum phosphate, and the rare-earth metal so that the mass ratio ((sum of content (on an $Al_2O_3 \cdot 3P_2O_5$ basis) of phosphorus and aluminum derived from mono aluminum phosphate and content (on an oxide basis) of rare-earth metal)/content of zeolite having a sodalite cage structure) of the sum of the content (on an $Al_2O_3 \cdot 3P_2O_5$ basis) of phosphorus and aluminum derived from mono aluminum phosphate and the content (on an oxide basis) of the rare-earth metal to the content of the zeolite having a sodalite cage structure is 0.01 to 1.0.

9. The catalyst according to claim 1, wherein the granulated catalyst A comprises the zeolite having a sodalite cage structure, phosphorus and aluminum derived from mono aluminum phosphate, and the rare-earth metal so that the mass ratio ((sum of content (on an $Al_2O_3 \cdot 3P_2O_5$ basis) of phosphorus and aluminum derived from mono aluminum phosphate and content (on an oxide basis) of rare-earth metal)/content of zeolite having a sodalite cage structure) of the sum of the content (on an $Al_2O_3 \cdot 3P_2O_5$ basis) of phosphorus and aluminum derived from mono aluminum phosphate and the content (on an oxide basis) of the rare-earth metal to the content of the zeolite having a sodalite cage structure is 0.01 to 0.5.

* * * * *